United States Patent
Roy et al.

(10) Patent No.: US 12,170,903 B2
(45) Date of Patent: Dec. 17, 2024

(54) METHODS AND APPARATUSES FOR UNMANNED AERIAL SYSTEM (UAS) IDENTIFICATION, BINDING AND PAIRING

(71) Applicant: INTERDIGITAL PATENT HOLDINGS, INC., Wilmington, DE (US)

(72) Inventors: Arnab Roy, Phoenixville, PA (US); Ravikumar V. Pragada, Warrington, PA (US); Samir Ferdi, Kirkland (CA); Michelle Perras, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 18 days.

(21) Appl. No.: 17/637,584

(22) PCT Filed: Aug. 21, 2020

(86) PCT No.: PCT/US2020/047400
§ 371 (c)(1),
(2) Date: Feb. 23, 2022

(87) PCT Pub. No.: WO2021/041214
PCT Pub. Date: Mar. 4, 2021

(65) Prior Publication Data
US 2022/0279355 A1    Sep. 1, 2022

Related U.S. Application Data

(60) Provisional application No. 62/890,920, filed on Aug. 23, 2019.

(51) Int. Cl.
*H04L 12/50*    (2006.01)
*H04W 12/06*    (2021.01)
(Continued)

(52) U.S. Cl.
CPC ......... *H04W 12/50* (2021.01); *H04W 12/068* (2021.01); *H04W 12/71* (2021.01); *H04W 60/04* (2013.01); *H04W 84/06* (2013.01)

(58) Field of Classification Search
CPC ... H04W 12/50; H04W 12/068; H04W 12/71; H04W 60/04; H04W 84/06; H04W 12/08; H04W 76/12; H04W 60/00
See application file for complete search history.

(56) References Cited

U.S. PATENT DOCUMENTS 10,185,316 B2    1/2019    Kablaoui
11,178,709 B2    11/2021    Zhang et al.
(Continued)

FOREIGN PATENT DOCUMENTS

CN    104936180    9/2015
CN    106131103    10/2017
(Continued)

OTHER PUBLICATIONS

ASTM, "Remote ID and Tracking Overview," WK65041 (Jul. 2, 2019).
(Continued)

*Primary Examiner* — Khalid M Almaghayreh
(74) *Attorney, Agent, or Firm* — Volpe Koenig

(57) ABSTRACT

Methods and apparatuses are described herein for paring an unmanned aerial vehicle (UAV) with a UAV-controller (UAV-C). For example, a UAV having a UAV wireless transmit/receive unit (UAV WTRU) may transmit, to an access and mobility management function (AMF), a non-access stratum (NAS) request message that includes a paring request indication and a UAV-controller (UAV-C) identification (UAV-C ID). The UAV-C ID may be carried in a paring request to an unmanned aerial system (UAS) service supplier (USS)/UAS traffic management (UTM) for paring
(Continued)

authorization of the UAV with a UAV-C associated with the UAV-C ID. The UAV may receive, from the AMF, a NAS response message that includes an unmanned aerial system (UAS) identification (UAS ID) indicating that the UAV is paired with the UAV-C, wherein the UAS ID is assigned by the USS/UTM.

20 Claims, 19 Drawing Sheets

(51) Int. Cl.
H04W 12/50 (2021.01)
H04W 12/71 (2021.01)
H04W 60/04 (2009.01)
H04W 84/06 (2009.01)

(56) References Cited

U.S. PATENT DOCUMENTS

| | | | |
|---|---|---|---|
| 2016/0225264 A1* | 8/2016 | Taveira | G08G 5/0013 |
| 2016/0288905 A1* | 10/2016 | Gong | G08G 5/0043 |
| 2018/0068567 A1* | 3/2018 | Gong | G05D 1/106 |
| 2018/0317086 A1 | 11/2018 | Ben Henda et al. | |
| 2019/0021064 A1* | 1/2019 | Ryu | H04W 60/06 |
| 2020/0023969 A1* | 1/2020 | Moon | B64C 39/024 |
| 2020/0036886 A1* | 1/2020 | Kim | G05D 1/101 |
| 2020/0186238 A1* | 6/2020 | Hong | G05D 1/10 |
| 2020/0236602 A1* | 7/2020 | Mahkonen | H04W 36/08 |
| 2020/0241572 A1* | 7/2020 | Hong | G08G 5/0065 |
| 2021/0065566 A1* | 3/2021 | Li | H04W 4/50 |
| 2021/0208602 A1* | 7/2021 | Yi | G05D 1/042 |
| 2021/0331798 A1* | 10/2021 | Yi | B64D 45/08 |
| 2021/0345117 A1* | 11/2021 | Zhang | H04W 12/63 |
| 2021/0362875 A1* | 11/2021 | Yi | G05D 1/101 |
| 2021/0405655 A1* | 12/2021 | Yi | H04W 4/40 |
| 2022/0022154 A1* | 1/2022 | Hong | H04W 60/00 |
| 2022/0070949 A1* | 3/2022 | Hong | H04W 60/04 |
| 2022/0086741 A1* | 3/2022 | Liao | H04W 4/44 |

FOREIGN PATENT DOCUMENTS

| | | |
|---|---|---|
| CN | 106100721 | 3/2019 |
| CN | 109716806 A | 5/2019 |
| WO | 2017/200978 A1 | 11/2017 |
| WO | 2018/008944 | 1/2018 |
| WO | 2018/171863 A1 | 9/2018 |
| WO | 2019/148188 | 1/2019 |
| WO | 2020143569 A1 | 7/2020 |
| WO | 2020200410 A1 | 10/2020 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Interdigital, "Conclusions for KI#6 and KI#7," SA WG2 Meeting #140e, S2-2005701, e-meeting (Aug. 19-Sep. 2, 2020).
Interdigital, "Connectivity setup for C2 communication and association between UAV and UAV-C," SA WG2 Meeting #139e, S2-2004168, 2e-meeting (Jun. 1-12, 2020).
Qualcomm Incorporated et al., "Key issues for FS_ID_UAS-SA2," SA WG2 Meeting #S2-136AH, S2-2001646, Incheon, South Korea (Jan. 13-17, 2020).
Qualcomm Incorporated et al., "KI#1, KI#2, KI#3, KI#7, New Sol: Solution for UAV authentication and authorization by USS/UTM," SA WG2 Meeting #139e, S2-2004672, e-Meeting (Jun. 1-8, 2020).
Qualcomm Incorporated et al., "KI#1, KI#2, KI#3, KI#7, Sol. 5: Update to eliminate editor's notes, clarify additional aspects, and merge in other solutions," SA WG2 Meeting #140E, S2-2005840, Electronic, Elbonia (Aug. 19-Sep. 2, 2020).
SA WG2, "Study on supporting Unmanned Aerial Systems Connectivity, Identification, and Tracking," TSG SA Meeting #SP-82, SP-181114, Sorrento, Italy (Dec. 12-14, 2018).
Tencent et al., "Pseudo-CR on Identifying new use case Key issue#X: USS Discovery and Synchronization service," 3GPP TSG-SA WG6 Meeting #36-Bis-E meeting, S6-200519 (Mar. 13-17, 2020).
Third Generation Partnership Project, "Technical Specification Group Core Network and Terminals; Non-Access-Stratum (NAS) protocol for 5G System (5GS); Stage 3 (Release 16)," 3GPP TS 24.501 V16.1.0 (Jun. 2019).
Third Generation Partnership Project, "Technical Specification Group Services and System Aspects; Study on Enhancement for Unmanned Aerial Vehicles; Stage 1 (Release 17)," 3GPP TR 22.829 V1.0.0 (Mar. 2019).
Third Generation Partnership Project, "Technical Specification Group Services and System Aspects; Enhancement for Unmanned Aerial Vehicles; Stage 1 (Release 17)," 3GPP TR 22.829 V17.1.0 (Sep. 2019).
Third Generation Partnership Project, "Technical Specification Group Services and System Aspects; Enhancement for Unmanned Aerial Vehicles; Stage 1 (Release 17)," 3GPP TR 22.829 V17.0.1 (Jul. 2019).
Third Generation Partnership Project, "Technical Specification Group Services and System Aspects; Remote Identification of Unmanned Aerial Systems; Stage 1 (Release 16)," 3GPP TR 22.825 V16.0.0 (Sep. 2018).
Third Generation Partnership Project, "Technical Specification Group Services and System Aspects; Study on supporting Unmanned Aerial Systems (UAS) connectivity, Identification and tracking (Release 17)," 3GPP TR 23.754 V0.1.0 (Jan. 2020).
Third Generation Partnership Project, "Technical Specification Group Core Network and Terminals; Non-Access-Stratum (NAS) protocol for 5G System (5GS); Stage 3; (Release 16)," 3GPP TS 24.501 V16.5.1 (Jul. 2020).
Third Generation Partnership Project, "Technical Specification Group Services and System Aspects; Unmanned Aerial System (UAS) support in 3GPP; Stage 1; Release 16," 3GPP TS 22.125 V16.3.0 (Sep. 2019).
Third Generation Partnership Project, "Technical Specification Group Services and System Aspects; Unmanned Aerial System (UAS) support in 3GPP; Stage 1; Release 16," 3GPP TS 22.125 V16.2.0 (Jun. 2019).

(56) References Cited

OTHER PUBLICATIONS

Third Generation Partnership Project, "Technical Specification Group Services and System Aspects; Unmanned Aerial System (UAS) support in 3GPP; Stage 1; Release 16," 3GPP TS 22.125 V16.1.0 (Mar. 2019).

Third Generation Partnership Project, "Technical Specification Group Services and System Aspects; Unmanned Aerial System (UAS) support in 3GPP; Stage 1; Release 17," 3GPP TS 22.125 V17.1.0 (Dec. 2019).

Third Generation Partnership Project, "Technical Specification Group Services and System Aspects; System Architecture for the 5G System; Stage 2 (Release 16)," 3GPP TS 23.501 V16.1.0 (Jun. 2019).

Third Generation Partnership Project, "Technical Specification Group Services and System Aspects; Procedures for the 5G System; Stage 2 (Release 16)," 3GPP TS 23.502 V16.1.1 (Jun. 2019).

Third Generation Partnership Project, "Technical Specification Group Services and System Aspects; Security architecture and procedures for 5G system (Release 15)," 3GPP TS 33.501 V15.5.0 (Jun. 2019).

Third Generation Partnership Project, "Technical Specification Group Services and System Aspects; Security architecture and procedures for 5G system (Release 15)," 3GPP TS 33.501 V15.9.0 (Jul. 2020).

Third Generation Partnership Project, "Technical Specification Group Services and System Aspects; Security architecture and procedures for 5G system (Release 16)," 3GPP TS 33.501 V16.3.0 (Jul. 2020).

Third Generation Partnership Project, "Technical Specification Group Services and System Aspects; System architecture for the 5G System (5GS); Stage 2 (Release 16)," 3GPP TS 23.501 V16.5.1 (Aug. 2020).

Third Generation Partnership Project, "Technical Specification Group Services and System Aspects; Procedures for the 5G System (5GS); Stage 2 (Release 16)," 3GPP TS 23.502 V16.5.1 (Aug. 2020).

Third Generation Partnership Project, "Technical Specification Group Services and System Aspects; Unmanned Aerial System support in 3GPP; Stage 1; Release 16," 3GPP TS 22.125 V16.0.0 (Dec. 2018).

* cited by examiner

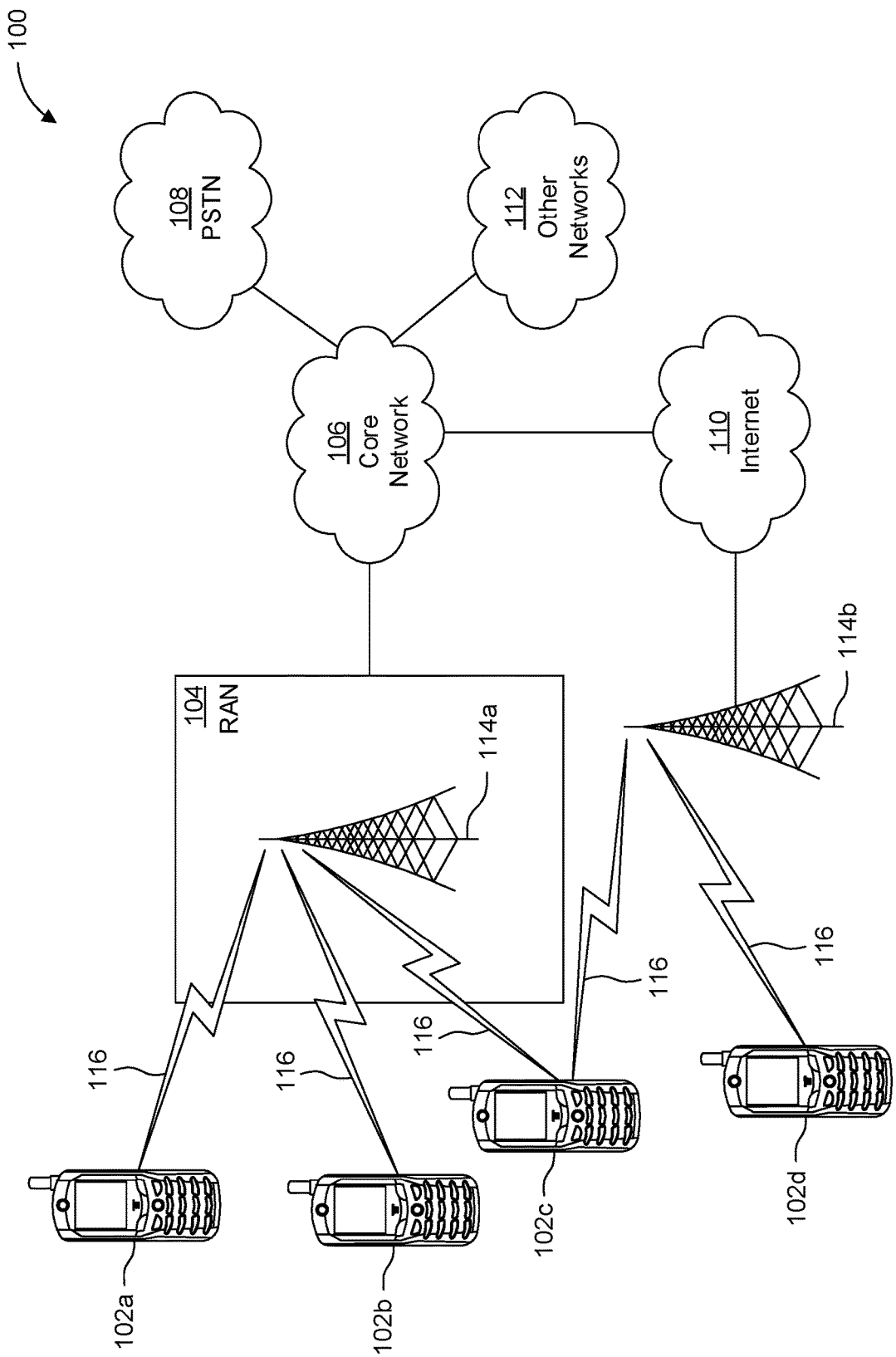

METHODS AND APPARATUSES FOR UNMANNED AERIAL SYSTEM (UAS) IDENTIFICATION, BINDING AND PAIRING

CROSS REFERENCE TO RELATED APPLICATIONS

This application is the U.S. National Stage, under 35 U.S.C. § 371, of International Application No. PCT/US2020/047400 filed Aug. 21, 2020, which claims the benefit of U.S. Provisional Application No. 62/890,920, filed Aug. 23, 2019, the contents of which are incorporated herein by reference.

BACKGROUND

The number of Unmanned Aerial Vehicle (UAV) has been rapidly growing in recent years and the applications enabled by UAV are expanding into a wide variety of industries. However, Unmanned Aerial System (UAS) (e.g., UAV and UAV-controller) today mostly rely on direct point to point communication via the unlicensed Industrial, Scientific and Medical (ISM) band, which limits the range of operation and the communication is usually unreliable, insecure and of low data rates. To fully unleash the potentials of UAV applications, cellular technologies such as Long Term Evolution (LTE) and 5G may be utilized to enable Beyond Visual Line of Sight (BVLOS) operation and high performance and reliable communication for UAS. For example, in carrying out its missions, a cellular-network-connected UAS may involve various types of cellular communication such as UAS to UAS Traffic Management (UTM) communication, non-payload communication, and/or payload communication. Thus, in order to implement such communication in cellular networks, methods and apparatuses that identifies, binds, pairs, and/or authenticates UAS in cellular networks are needed.

SUMMARY

Methods and apparatuses are described herein for paring an unmanned aerial vehicle (UAV) with a UAV-controller (UAV-C). For example, a UAV having a UAV wireless transmit/receive unit (UAV WTRU) for cellular communication may transmit, to an access and mobility management function (AMF), a non-access stratum (NAS) request message that includes a paring request indication and a UAV-controller (UAV-C) identification (UAV-C ID). The UAV-C ID may be carried in a paring request to an unmanned aerial system (UAS) service supplier (USS)/UAS traffic management (UTM) for paring authorization of the UAV with a UAV-C associated with the UAV-C ID. The paring request to the USS/UTM for the paring authorization of the UAV with the UAV-C may include the UAV ID and the UAV-C ID. The UAV may receive, from the AMF, a NAS response message that includes an unmanned aerial system (UAS) identification (UAS ID) indicating that the UAV is paired with the UAV-C, wherein the UAS ID is assigned by the USS/UTM. The NAS request message may be a protocol data unit (PDU) session request message and the NAS response message may be a PDU session response message.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1A is a system diagram illustrating an example communications system in which one or more disclosed embodiments may be implemented;

DETAILED DESCRIPTION

Figure 1B:
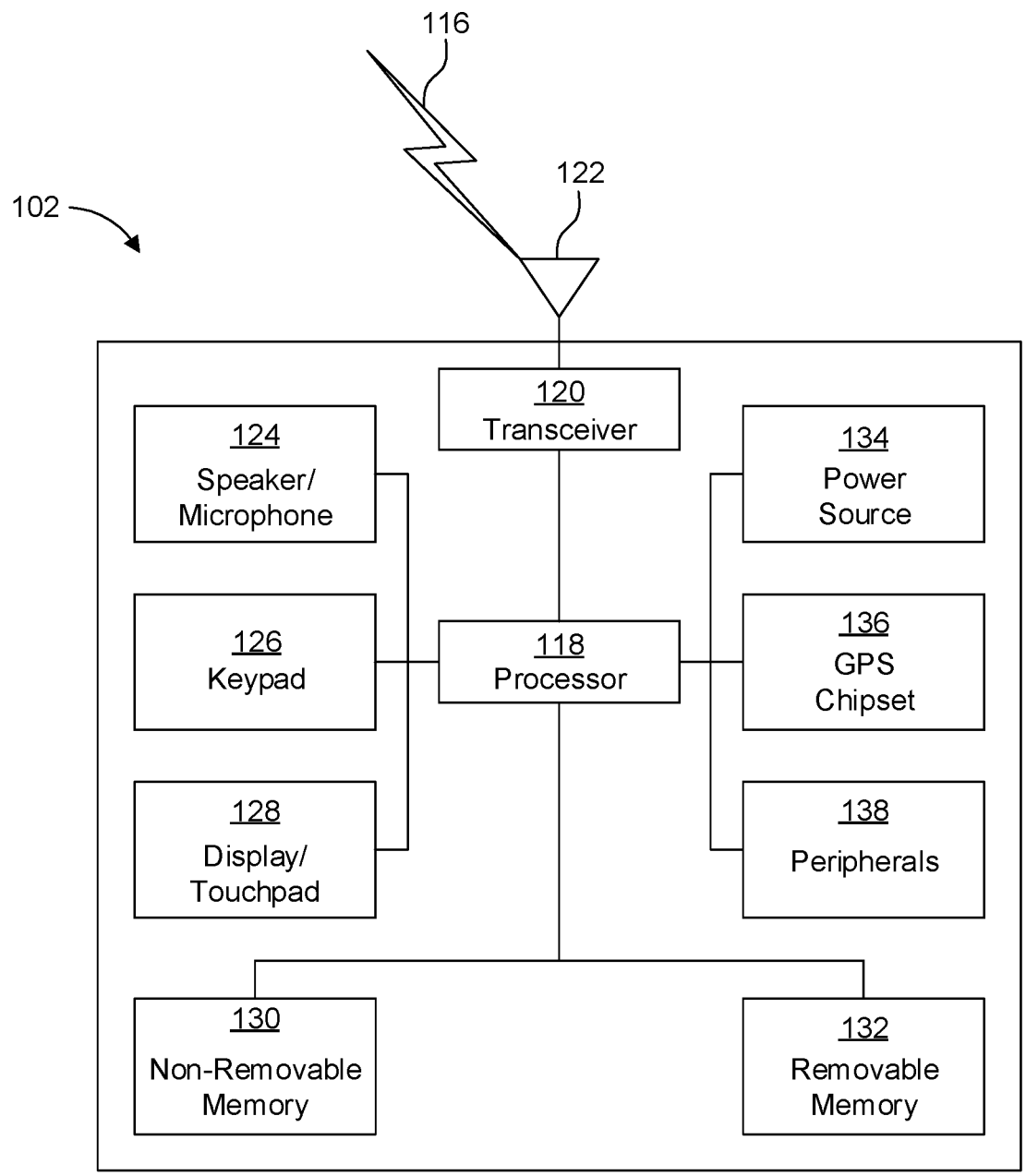
FIG. 1B is a system diagram illustrating an example wireless transmit/receive unit (WTRU) that may be used within the communications system illustrated in FIG. 1A according to an embodiment.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a unmanned aerial vehicle (UAV), a UAV WTRU, a UAV UE, a unmanned aerial vehicle-controller (UAV-C), a UAV-C WTRU, a UAV-C UE, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114 a and the WTRUs 102 a, 102 b, 102 c may implement radio technologies such as IEEE 802.11 (i.e., Wireless Fidelity (WiFi®), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VOIP) services to one or more of the WTRUs 102 a, 102 b, 102 c, 102 d. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi® radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
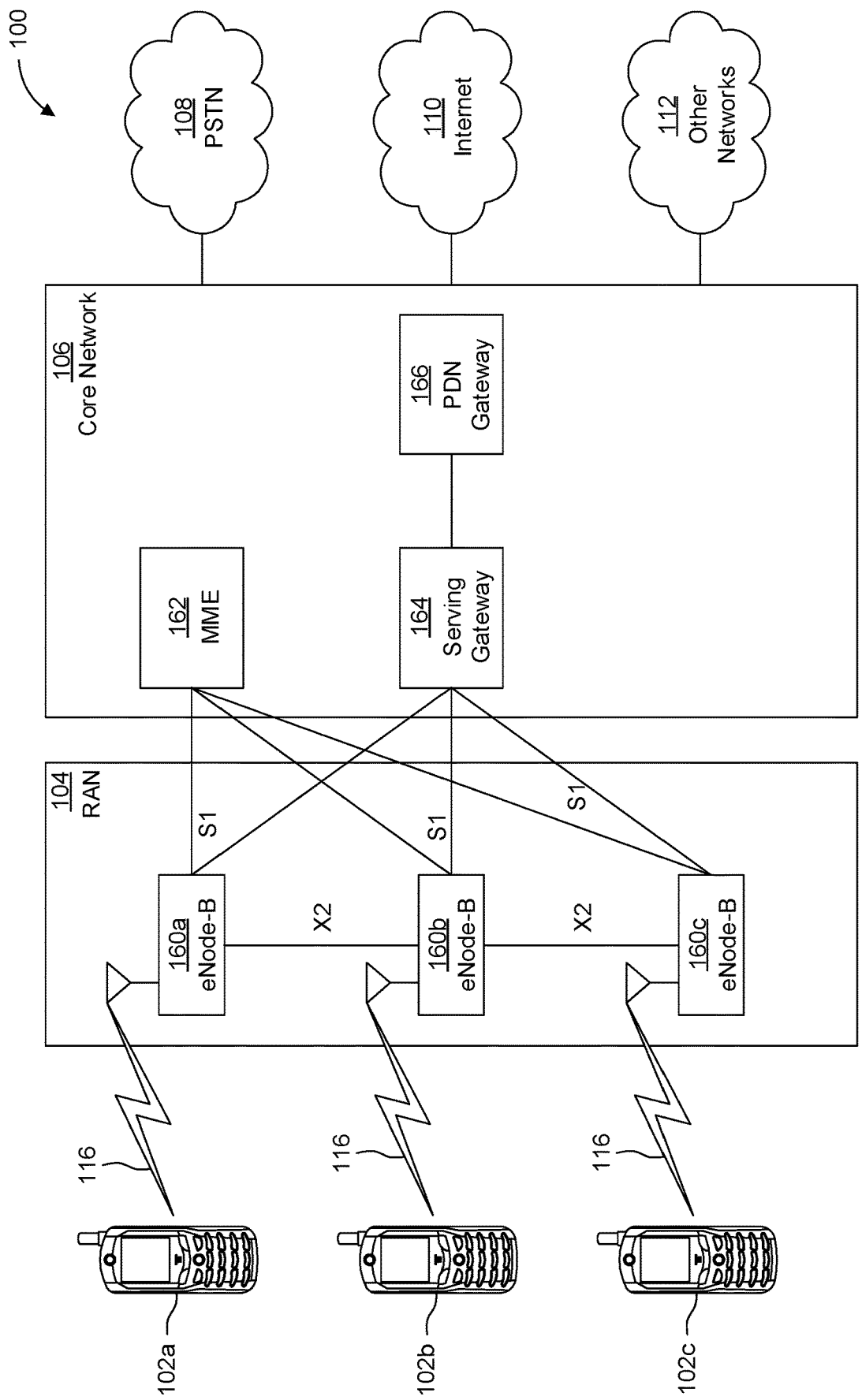
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
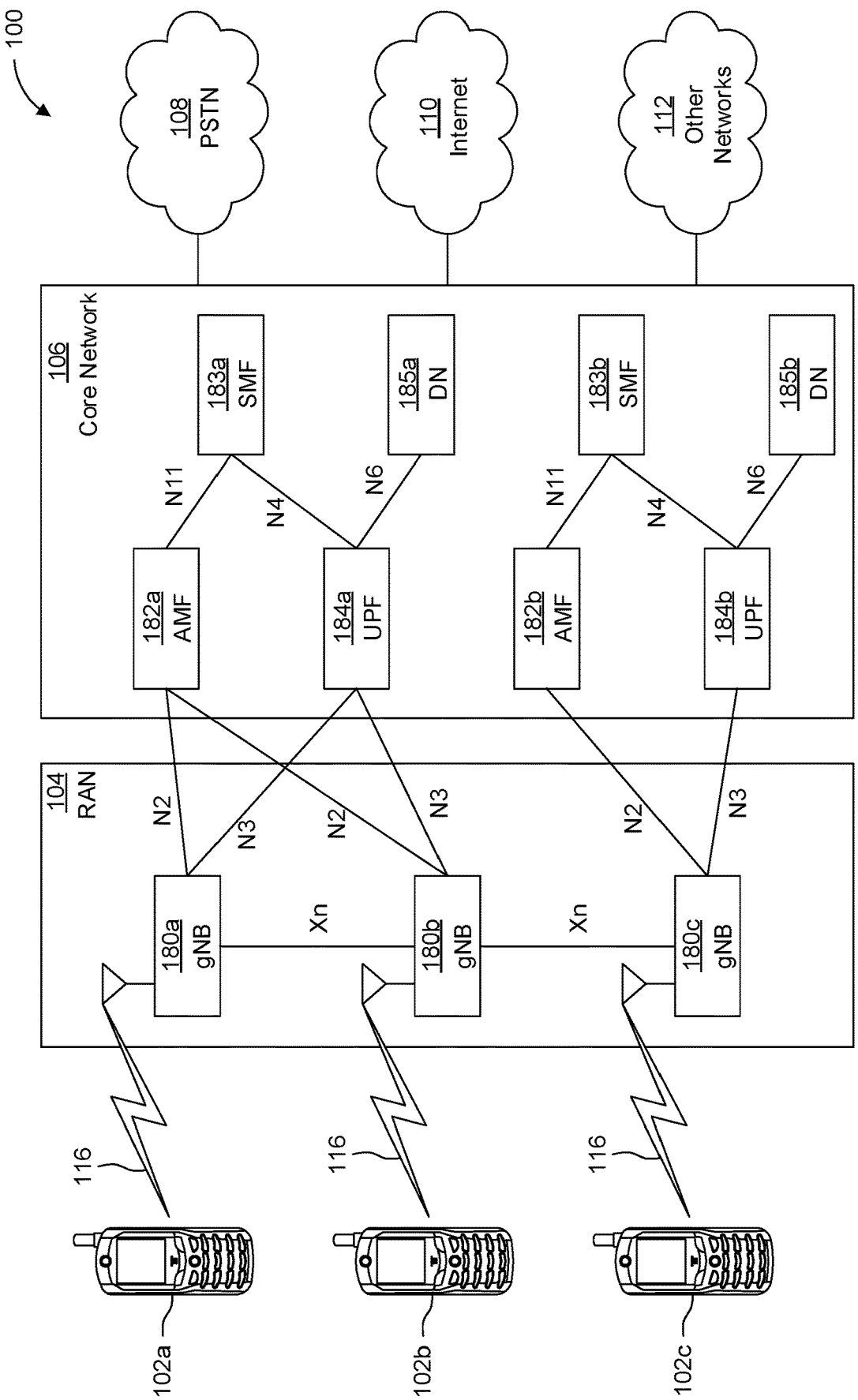
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182 a, 182 b may be connected to one or more of the gNBs 180 a, 180 b, 180 c in the RAN 104 via an N2 interface and may serve as a control node. For example, the AMF 182 a, 182 b may be responsible for authenticating users of the WTRUs 102 a, 102 b, 102 c, support for network slicing (e.g., handling of different protocol data unit (PDU) sessions with different requirements), selecting a particular SMF 183 a, 183 b, management of the registration area, termination of non-access stratum (NAS) signaling, mobility management, and the like. Network slicing may be used by the AMF 182 a, 182 b in order to customize CN support for WTRUs 102 a, 102 b, 102 c based on the types of services being utilized WTRUs 102 a, 102 b, 102 c. For example, different network slices may be established for different use cases such as services relying on ultra-reliable low latency (URLLC) access, services relying on enhanced massive mobile broadband (eMBB) access, services for MTC access, and the like. The AMF 182 a, 182 b may provide a control plane function for switching between the RAN 104 and other RANs (not shown) that employ other radio technologies, such as LTE, LTE-A, LTE-A Pro, and/or non-3GPP access technologies such as WiFi®.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The number of unmanned aerial vehicle (UAV) has been rapidly growing in recent years and the applications enabled by a UAV are expanding into a wide variety of industries. However, an unmanned aerial system (UAS) (e.g., UAV and UAV-controller) today mostly rely on direct point to point communication via the unlicensed industrial, scientific, and medical (ISM) band, which limits the range of operation and the communication is usually unreliable, insecure and of low data rates. To fully unleash the potentials of UAV applications, advanced cellular technologies such as LTE and 5G may be utilized to enable Beyond Visual Line of Sight (BVLOS) operation and high performance and reliable communication for UAS.

The benefits of using cellular networks are obvious. For example, ubiquitous mobile network coverage can provide the operation range that is far beyond that limited by the point-to-point communication using ISM frequencies. Advanced communication capabilities, such as high bandwidth, low latency, guaranteed QoS, etc., of modern cellular networks (especially 5G network) greatly improves the performance of UAV applications. Advanced security mechanisms of modern cellular network can address the strong security concerns involved in managing UAV applications.

Figure 2:
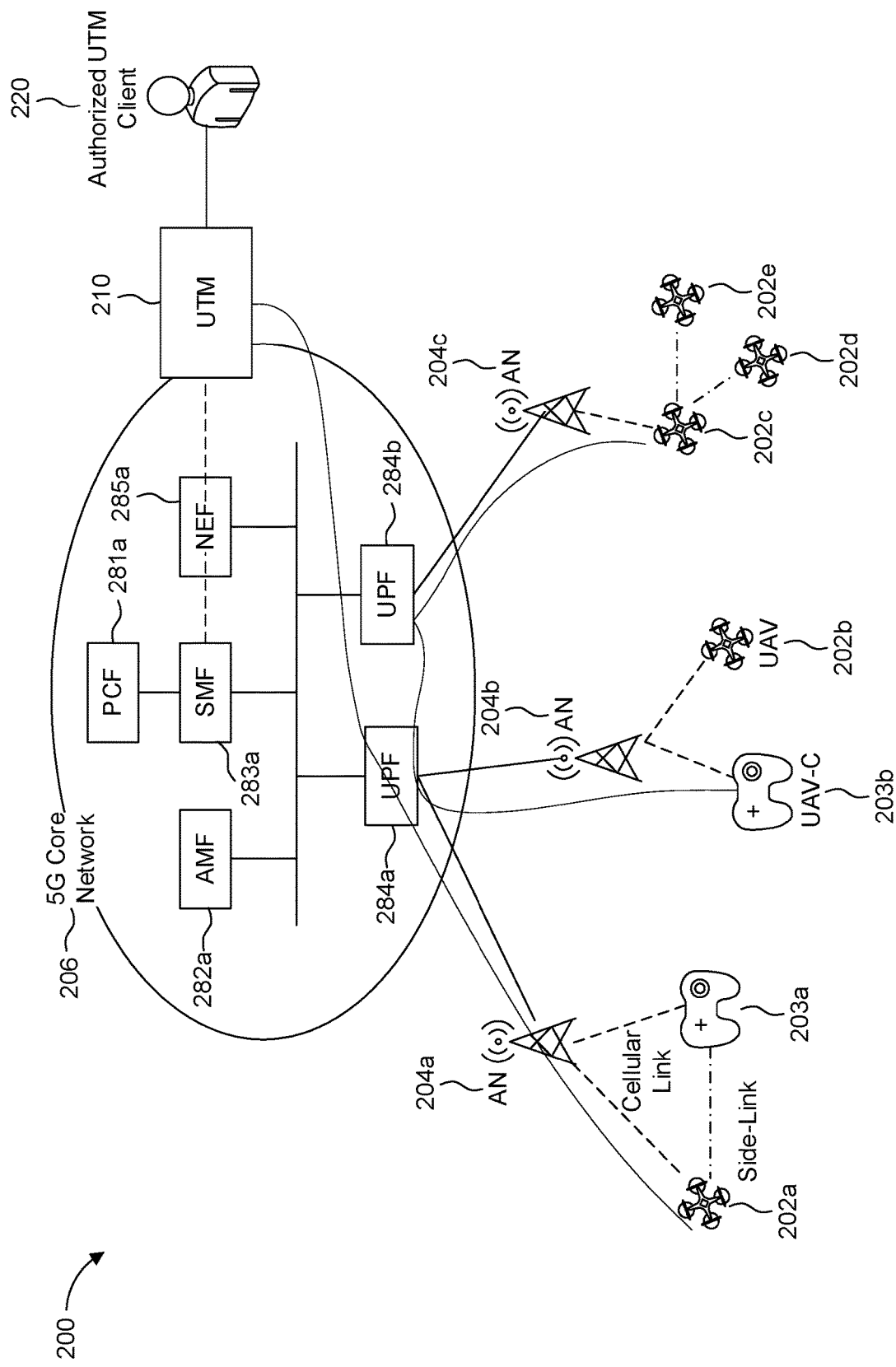
FIG. 2 is a diagram illustrating an example architecture for supporting unmanned aerial system (UAS) in a 5G network.

FIG. 2 illustrates an example architecture 200 for supporting unmanned aerial system (UAS) in a 5G network, which may be used in combination with any of other embodiments described herein. As illustrated in FIG. 2, UAS traffic management (UTM) 210 may be a framework for UAS traffic management. The roles and responsibilities of UTMs 210 and the procedures and protocols applied in UTMs 210 may vary between countries. UTM 210 may refer to a set of functions for authenticating UAV, authorizing UAS services, managing UAS policies and controlling UAV traffics in the airspace. For example, UTM may be a server implementing such functions for UAV, UAV-C, and/or UAS. The authorized users or UTM client 220 may query the identity and metadata of a UAV 202*a-e* and its UAV controller 203*a, b* via the UTM 210. The UTM 210 may store the data required for UAS to operate. Air traffic control agency may use the UTM server 210 to authorize, enforce and/or regulate UAS operation.

As illustrated in FIG. 2, the 5G core network 206 may comprise PCF 281*a*, SMF 282*a*, SMF 283*a*, UPF 284*a, b*, NEF 285*a* and the like. In the architecture illustrated in FIG. 2, the UAS (e.g., UAV 202*a-e* and/or UAV-C 203*a, b*) may communicate with the UTM 210 via the network user plane for identification, authentication and authorization procedures and also for other command and control message/data exchanges. The 3GPP network functions (such as SMF 283*a*, PCF 281*a*, or the like) may have direct or indirect (e.g., via network exposure function (NEF 285*a*)) control interfaces with the UTM 210, too. A UAV may include WTRU or UAV WTRU for cellular network communications (e.g., 3GPP, 5G, 6G or the like). In this regard, the WTRU or the UAV WTRU may refer to embedded communication equipment (e.g., 3GPP modem/module/chipset enabling 3GPP communication) that enables the UAV to communicate over the cellular network. The WTRU or UAV WTRU may include SIM or USIM in the equipment for the subscription of the cellular communication. The terms WTRU, UE, UAV WTRU, UAV UE, WTRU on board a UAV, and UE onboard a UAV may be interchangeably used throughout this disclosure. Similar to UAV, UAV-C may include WTRU or UAV-C WTRU for cellular network communications (e.g., 3GPP, 5G, 6G or the like). In this regard, the WTRU or the UAV-C WTRU may refer to embedded communication equipment (e.g., 3GPP module enabling 3GPP communication) that enables the UAV-C to communicate over the cellular network. The terms WTRU, UE, UAV-C WTRU, UAV-C UE, WTRU on board a UAV-C, and UE onboard a UAV-C may be interchangeably used throughout this disclosure. The UAV WTRU or UAV-C WTRU may include SIM or USIM in the embedded communication equipment for the subscription of the cellular communication.

Figure 3:
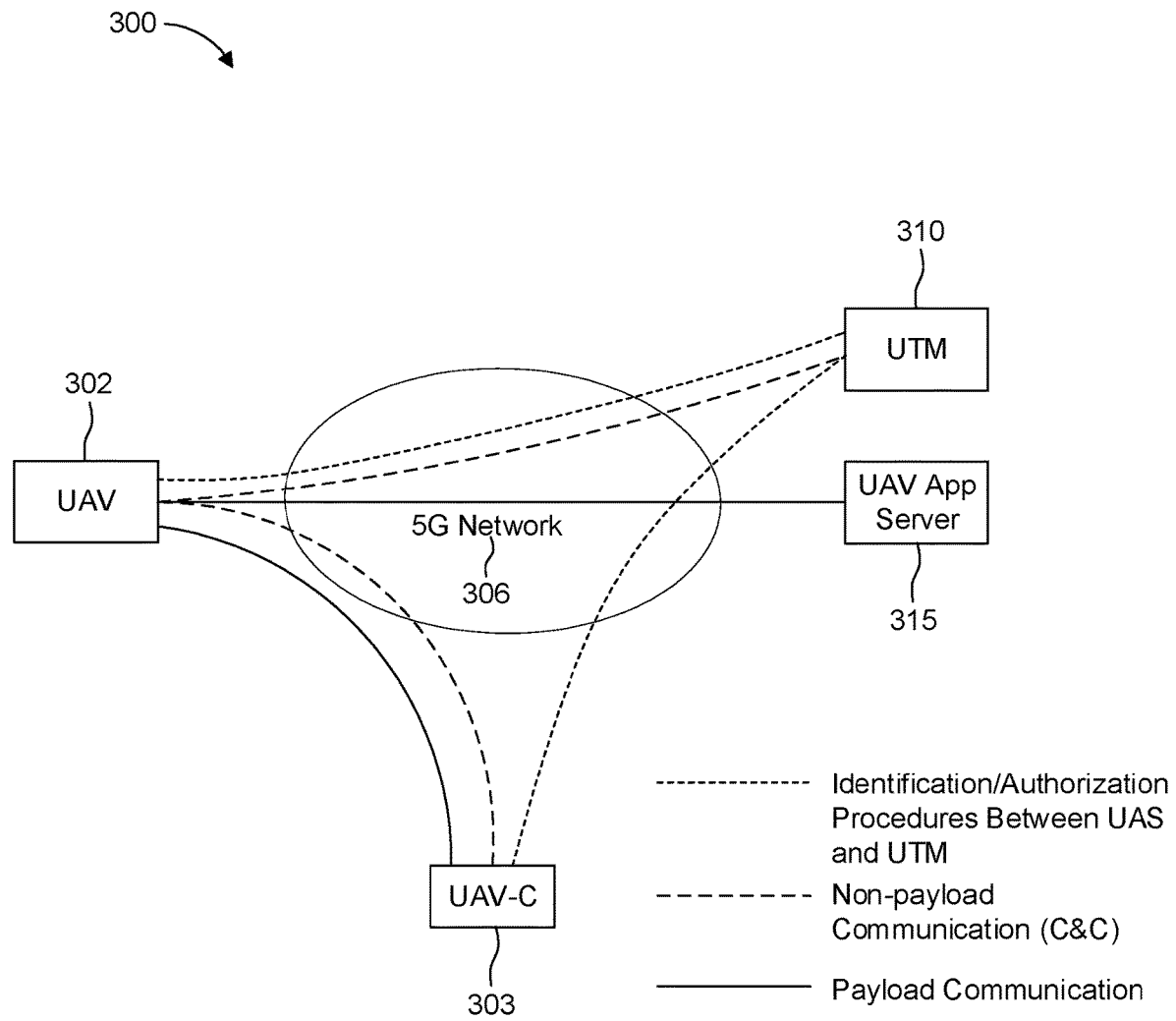
FIG. 3 is a diagram illustrating example types of unmanned aerial vehicle (UAV) communication enabled by a cellular network.

Example communication for UAS are described herein. FIG. 3 illustrates example types of unmanned aerial vehicle (UAV) communication 300 enabled by a cellular network, which may be used in combination with any of other embodiments described herein. As illustrated in FIG. 3, a cellular-network-connected UAS (e.g., UAV 302 and/or UAV-C 303) may involve various types of cellular communication for carrying out its missions: UAS-UTM communication, non-payload communication (i.e. command and control), and payload communication.

UAS-UTM communication may refer to the communication between UAS and UTM. UAS-UTM communication may need to be enabled, for example, for identification, authorization, "command & control" and law enforcement activities. It may be assumed that user plane connection is used between UAS and UTM, although it is also possible to use control plane communication between the two. A UAS may refer to a UAV and/or a combination of UAV and UAV-C.

Non-payload communication may include command and control (C&C or C2) communication. Command and control message and data exchange is of critical importance for UAV missions and security concerns. Some C&C exchange (e.g., location or flight data reporting) may happen between the UAV and the UTM, and between the UAV and its UAV-C. The UAV and UAV-C may perform C2 communications based on a PDU session established between the UAV and the UAV-C using the cellular network (e.g., 5G).

Example types of C&C or C2 communication may include, but are not limited to, as disclosed in Table 1 below:

TABLE 1

| C2 communication Types | Definition |
|---|---|
| UA communicates telemetry | The UA may maintain onboard information on location, internal systems status/health, stage of mission completion, etc., and telemetry may be used here to denote the reporting of this information to ground systems. Reporting may be periodic or queried, and the intervals for periodic reporting may change over time. For example, telemetry information may be sent at a higher frequency during take-off/landing or during other unusual or potentially dangerous flight phases. Since the information conveyed may be typically formatted alpha-numeric content, 10-100s of bytes is usually sufficient to contain a complete set of telemetry messages. Ground systems and/or ground personnel monitoring telemetry streams may need 1-10 Hz updates of this information. Thus, a maximum requirement may be 100 bytes every second ~1 kbps. |

TABLE 1-continued

| C2 communication Types | Definition |
|---|---|
| UA receives mission update | While a mission is proceeding, a change in the objectives or constraints related to that mission may create a need to make an adjustment to the plan, a completely new plan, or simply an abort of the current mission. This mission update may be sent to the UA to allow it to change its operation. This is related to the previous "constraint update" message type, but here the mission plan may be impacted directly.<br>[10s to 100s of bytes] |
| UA receives constraint update (geofence, directive/ warning, collision warning) | Ground systems can monitor conditions and events relevant to the mission of a particular UA and flag instances that need to be communicated to the UA. For example, an unexpected event may create a hazardous volume in space that may impact the UA which would be suitable for a geofence update. Update of mission plans for other UAs may create a trajectory with a high probability of intersecting with the UA's current planned trajectory, leading to a need for a collision warning. Also, regulatory updates of warning and directives may be communicated with the UA.<br>These "constraint" updates may be taken into consideration during the navigation and mission execution onboard the UA.<br>[10s to 100s of bytes] |
| UA receives external data update (weather, local info) | Similar to constraint update, this messaging may give external information that can be incorporated in the UA's mission execution. However, while a constraint update provides concrete information related to navigation specifics and exclusions, this data update may provide more abstract information such as weather. The impact of this information on specific mission navigation and behaviour may depend on the on-board autonomy algorithms. |
| UA communicates updates to mission plan performed locally | As a UA performs local mission optimization based on local sensing and external information, the updates to the mission may be sent back to ground operations to enable them to understand the updated plan and intent. This may be needed to enable the ground to correctly predict potential hazards and to route warnings and directives relevant to the UA.<br>[10s to 100s of bytes] on-board |
| UA/operator requests mission clearance | This communication may be the same as a mission update, but with the intent that the mission can be evaluated by a regulatory authority and granted (with or without conditions) or denied. While this communication may be performed by an operator rather than the UA, this may be included here to cover that case that the UA locally computes mission specifics or a mission update.<br>[10s to 100s of bytes] |
| UA/operator provides regulatory data | Regulatory compliance may require log data to help quantify regulatory compliance or even to influence future rulemaking. This type of data may not be well characterized as C2 but included here for completeness since it would be generated by the flight system. |
| Remote operator provides hazard assist | Nominally, a UA is equipped to self-navigate including on-board risk avoidance and mitigation. In the event that a remote human operator is required to help (e.g., finding a safe place to land), the C2 link may need to provide real-time feedback to the operator, and carry real-time flight commands (up, down, left right). The latency requirement for this use may be in the 100s of ms because the operator is not required to stabilize the flight, rather to direct its movement.<br>~1 Mbps from the UA for video stream, ~1 kbps to the UA for commands<br>250 ms total round-trip latency |
| Identification and credential information | A UA may need to have the capability for providing a secure and reliable identification to operators, regulators, and other parties such as law enforcement. Compliance or even to influence future rulemaking. This type of data may not be well |

TABLE 1-continued

| C2 communication Types | Definition |
|---|---|
| | characterized as C2 but included here for completeness since it could impact flight operations. |

For payload communication, a UAV in mission may send payload data, such as real-time video or sensor data, to its UAV-C or some application server or storage in the network. Payload communication may be usually heavy in the uplink and light in the downlink.

3GPP has identified use cases and potential requirements for UAS support in 3GPP specifications. In particular, requirements for UAS remote identification and authorization have been specified in 3GPP specifications Additional enhancements for UAS support in 3GPP may include: UAS command and control (C2) communications; unmanned aerial vehicle (UAV) navigation by a UAV-controller (UAV-C) or by a UAS traffic management (UTM); and/or change of UAV-C during a flight mission.

Figure 4:
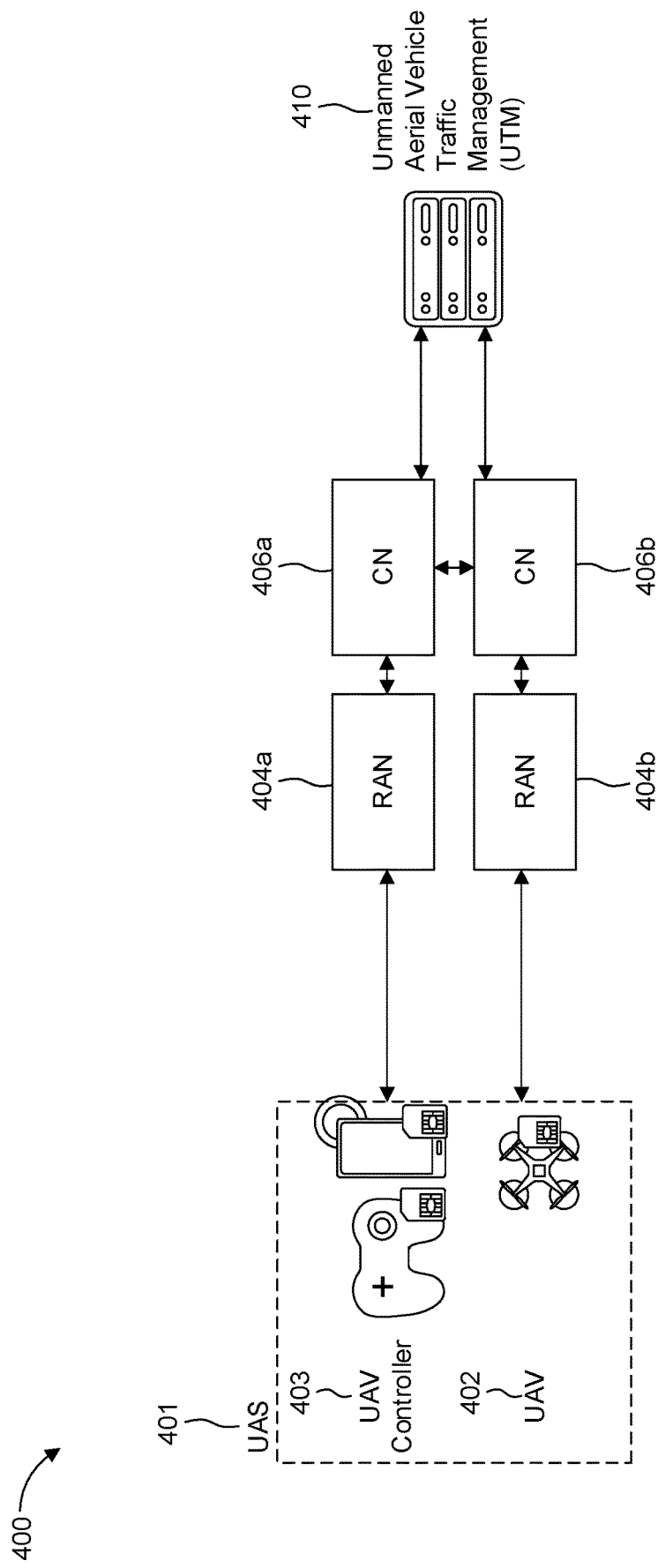
FIG. 4 is a diagram illustrating an example UAS interaction with a network and UAS traffic management (UTM) for authorization.

FIG. 4 illustrates an example UAS interaction 400 with a network and UAS traffic management (UTM) for authorization, which may be used in combination with any of other embodiments described herein. As illustrated in FIG. 4, a UAS 401 may refer to the combination of a UAV 402 (e.g., drone) and a UAV-C 403 and the network may comprise RANs 404a, 404b and CNs 406a, 406b. The 3GPP system (e.g., RANs 404a, 404b and CNs 406a, 406b) may provide the communications capabilities between the UAV 402 and UAV-C 403 which may communicate through the same or different RAN nodes (e.g., 404a, 404b) and including via different PLMNs. The UTM 410 may provide UAS identification and tracking, authorization, enforcement, and regulation of UAS operations, and also to store the data required for UAS(s) to operate.

In one embodiment, a UAV and a UAV-C may be paired, and identified as a UAS by the 3GPP system and/or UTM. Specifically, the network may responsible of asserting WTRU (e.g., UAV WTRU or UAV-C WTRU) 3GPP credentials for initial network access while the UTM is responsible for asserting UAS credentials for the UAS to operate. The network and UTM may need to be able to associate the UAV and the UAV-C and identify them as a UAS during authorization procedures to ensure that access to command and control (C2) communications service and flight operations is granted and enforced for that particular UAS (i.e. UAV and UAV-C pair).

A given UAV-C may be in command of a fleet of UAVs and authorized to operate in the context of multiple UAS. For example, the UAV-C may be required to perform a separate authentication and authorization procedure to be able to control another UAV (i.e. establish yet another UAS identifier with the network/UTM). Another scenario where a unique UAS identifier establishment may be crucial is during a change of UAV-C, where the control of a UAV may be switched over to a new UAV-C during flight operations (e.g., due to an emergency event). The 3GPP system and UTM may need to identify the UAV and the new UAV-C pair as yet another UAS, separate from the one comprising the UAV and old UAV-C.

During UAS authentication and authorization procedures, it may be assumed that the 3GPP system may provide the UTM with one or more 3GPP identifiers (e.g., MSISDN, IMEI of UAV WTRU/UAV-C WTRU) and in return the UTM may provide the network with a corresponding UAS ID. The UAS ID may also be referred as a Civil Aviation Authority (CM) Level UAV ID. The 3GPP identifier(s) used to identify the UAV may also be referred as 3GPP UAV ID. These various identifiers may be exchanged and authenticated between the WTRU (e.g., UAV WTRU, UAV-C WTRU), network and UTM, 3GPP system may enable a secure UAS pairing mechanism (e.g., mitigate spoofing attacks on UAS identities).

In another embodiment, airframe identifier (such as manufacturer serial number, etc.—called UAV ID) and 3GPP modem identifier (such as the IMSI—called UAV WTRU ID here) identified by the 3GPP system and/or the UTM/USS may be tied together or bound for UAVs with removable cellular modems. With these tied or bounded identifiers, flight authorization for a UAS may be achieved by a 3GPP system, with assistance for UTM/USS.

Specifically, for ease of operations, flexibility and economic reasons, UAVs may support removable cellular modems (e.g., WTRU or UAV WTRU). Further, for deployments in different locations, swappable modems and/or swappable SIMs/UICCs may be desired. For similar reasons, UAV-Cs may adopt a similar architecture. For the 3GPP system, the UAV WTRU ID and UAV-C WTRU ID may hold relevance, while from the UTM/USS perspective the essential identifiers may be the UAV ID and UAV-C ID. Therefore, methods and apparatuses are needed to bind these different identities for cross-referencing across the two domains—cellular and UTM/USS, and also to enable different levels of authorization leading up to flight authorization and possibly additional services.

The 3GPP system may enable a UAS to send different UAS data to UTM based on the different authentication and authorizations level which are applied to the UAS. It is noted that subject to the regional regulation, the different authentication and authorization levels can be: the initial network access authentication and authorization, UAS identity authentication, UAV flight plan authorization, additional UMT service authentications, such as flight monitoring, collision avoidance services, or the like.

In another embodiment, a UAV, UAV-C and their associated WTRUs may be authenticated and/or authorized by multiple UTMs/USSs. A single UAV flight mission may require support from more than one UTM/USS. One reason could be that the UAV flight plan spans areas that are not controlled/covered by a single UTM/USS. In such a scenario, a UAV and its controller and their associated WTRUs need be identified, authenticated and authorized by all relevant UTMs/USSs before flight and 3GPP system usage are allowed.

In another embodiment, mutual exchange of identifiers, authentication and authorization of UAV and UAV-C may be accomplished when they belong to different PLMNs. The 3GPP network may need to support UAVs and the corresponding UAV-C are connecting to different PLMNs at the same time.

Embodiments for UAV/UAV-C (e.g., UAS) pairing and authorization are described herein.

Figure 5A:
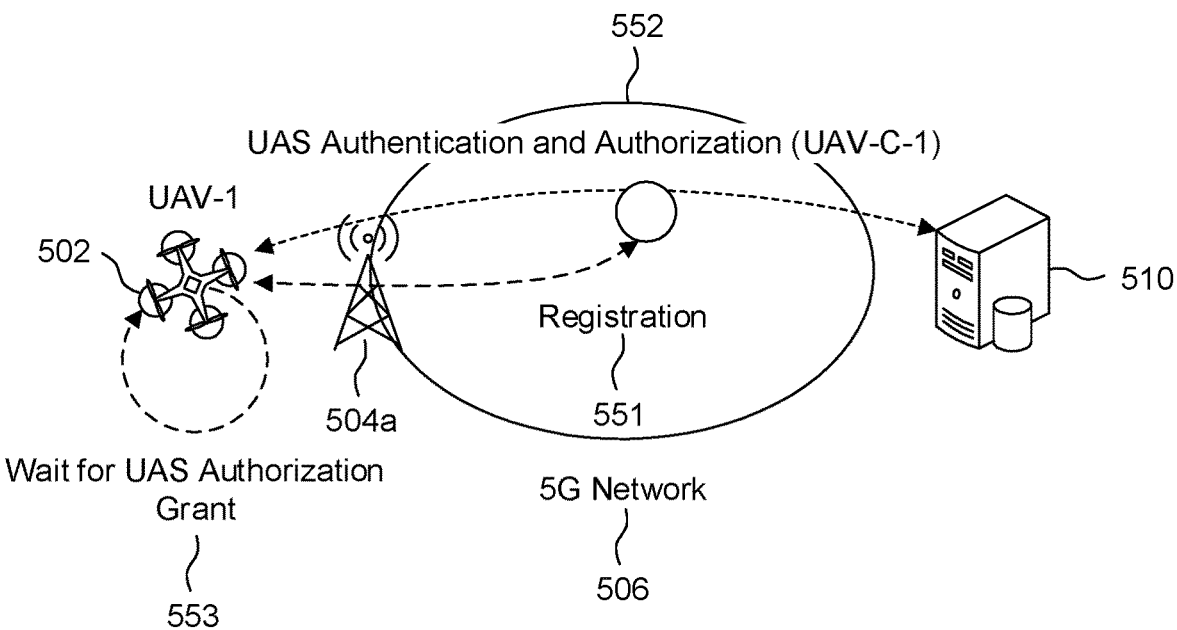
FIG. 5A is a diagram illustrating an example UAS paring and authorization scenario where a UAV is coming online.
Figure 5B:
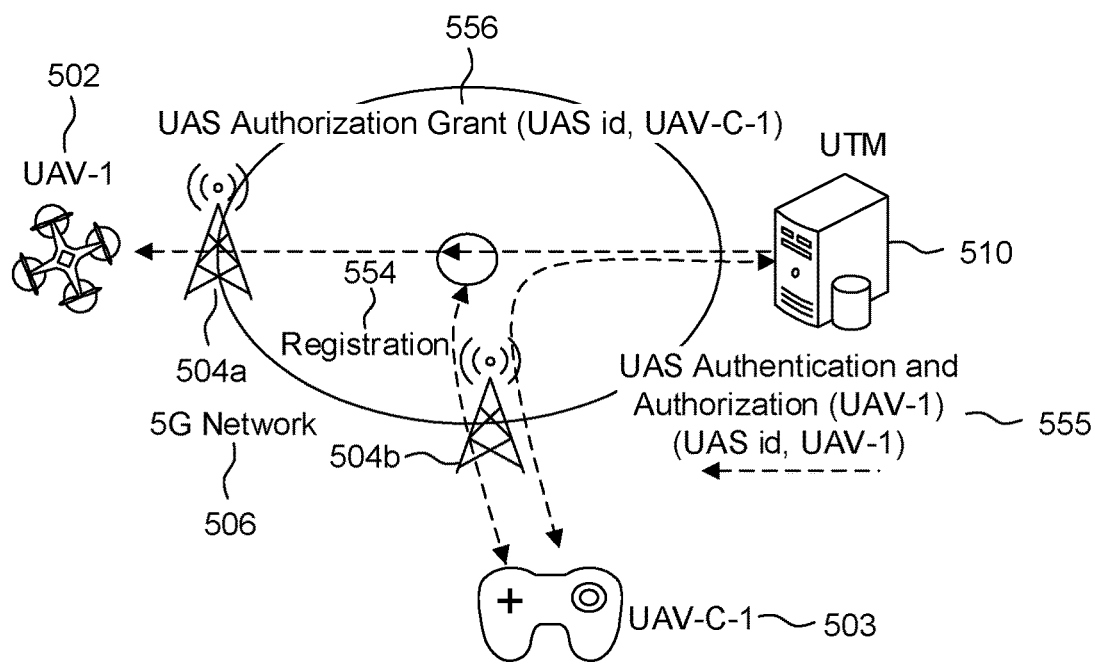
FIG. 5B is a diagram illustrating an example UAS paring and authorization scenario where a UAV-C is coming online.
Figure 5C:
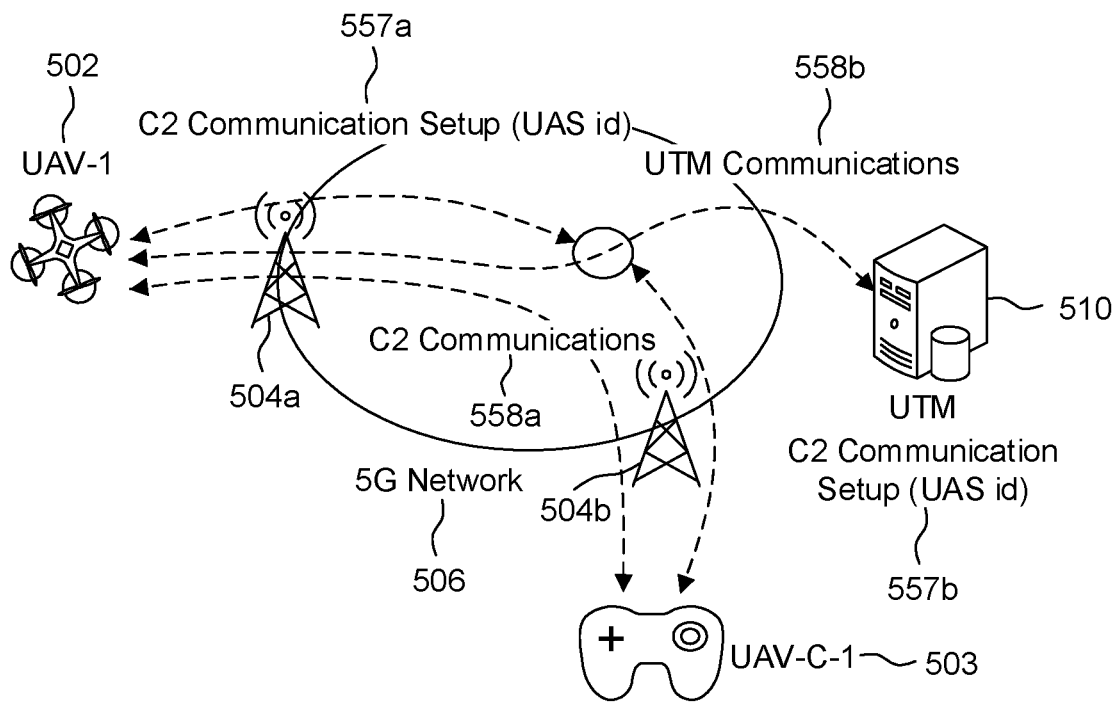
FIG. 5C is a diagram illustrating an example UAS paring and authorization scenario where a UAV and a UAV-C are establishing communication.

FIGS. 5A-C illustrate example UAS paring and authorization scenarios, which may be used in combination with any of other embodiments described herein. As illustrated in FIGS. 5A-C, a UAV 502 and UAV-C 503 may be paired as a UAS while being authenticated and authorized by a UTM 510. The UAS pairing during authentication and authorization scenario may include the following phases: (1) the WTRU (i.e. UAV WTRU) comes online; (2) the UAV-C comes online; and (3) the UAV and UAV-C establish C2 communications.

FIG. 5A illustrates an example UAS paring and authorization scenario where a UAV 502 is coming online, which may be used in combination with any of other embodiments described herein. With respect to the first phase (i.e. the WTRU or UAV WTRU comes online), at step 551, the UAV 502 may register with the network, for example a 5G network 506. At step 552, the UAV 502 may authenticate with the UTM 510 via the network 506 (e.g., using a control plane or user plane path). In the process, the UAV 502 may provide an identifier of the target UAV-C 503 if available (e.g., UAV-C ID). At step 553, the UAV 502 may be only partially authorized and wait for a final authorization to fly. The final authorization may be conditional on a UAV-C 503 obtaining the authorization to pilot the UAV 502. The UAV 502 may not be authorized by the network 506 to use a C2 communication service until that final authorization to fly is granted. In that case, the UAV 502 may remain in an idle state awaiting to be notified (e.g., asynchronously) by UTM 510/network 506 of the final authorization (e.g., via paging, application notification, or the like).

FIG. 5B illustrates an example UAS paring and authorization scenario where a UAV-C 503 is coming online, which may be used in combination with any of other embodiments described herein. With respect to the second phase (i.e. the UAV-C 503 comes online), at step 554, the UAV-C 503 may register with the network 506. At step 555, the UAV-C 503 may authenticate with the UTM 510 via the network 506 (e.g., using a control plane or user plane path). In the process, the UAV-C 503 may provide an identifier of the target UAV 502 if available (e.g., UAV WTRU ID). If the target UAV 502 is already temporarily authorized (as described in FIG. 5A), the UAV-C 503 may obtain authorization to operate as part of the procedure. In the process, the UAV-C 503 may obtain an assigned UAS ID (and/or Remote ID) identifying the UAV-C 503, UAV 502 pair in the UTM 510. The authorized UAS ID may be obtained as part of the authentication and authorization exchange or via a later notification (as for the UAV502 below). At step 556, the UAV 502 may receive a final authorization grant notification indicating the UAS ID and associated UAV-C ID.

FIG. 5C illustrates an example UAS paring and authorization scenario where a UAV 502 and a UAV-C 503 are establishing communication, which may be used in combination with any of other embodiments described herein. With respect to the third phase (i.e. the UAV 502 and UAV-C 503 establish C2 communications), at steps 557a b, the UAV 502 and UAV-C 503 may establish a C2 communication path, for example, using PDU session establishment. The UAS ID and optionally ID of a peer WTRU (i.e. UAV WTRU and/or UAV-C WTRU) in the UAS may be indicated during the connection setup. At step 558, the UAV 502 and UAV-C 503 may exchange C2 data traffic.

It is noted that the embodiment described in FIGS. 5A-C may happen in the reverse order where the UAV-C 503 may request authorization for UAS operations first. In that case, the UAV-C 503 may perform steps described in the first phase of FIG. 5A, while the UAV 502 may perform steps as in the second phase of FIG. 5B (i.e., by swapping the UAV 502 and UAV-C 503 actors in FIGS. 5A,B). It is also noted that the steps described in each phase in FIGS. 5A-C are not limited to the sequential order but may be performed or executed in any order to achieve UAV registration/authentication, UAV-C registration/authentication, and/or C2 communication establishment between the UAV 502 and UAV-C 503.

Embodiments for UAV-C/UAV assisted UAS pairing are described herein.

Figure 6:
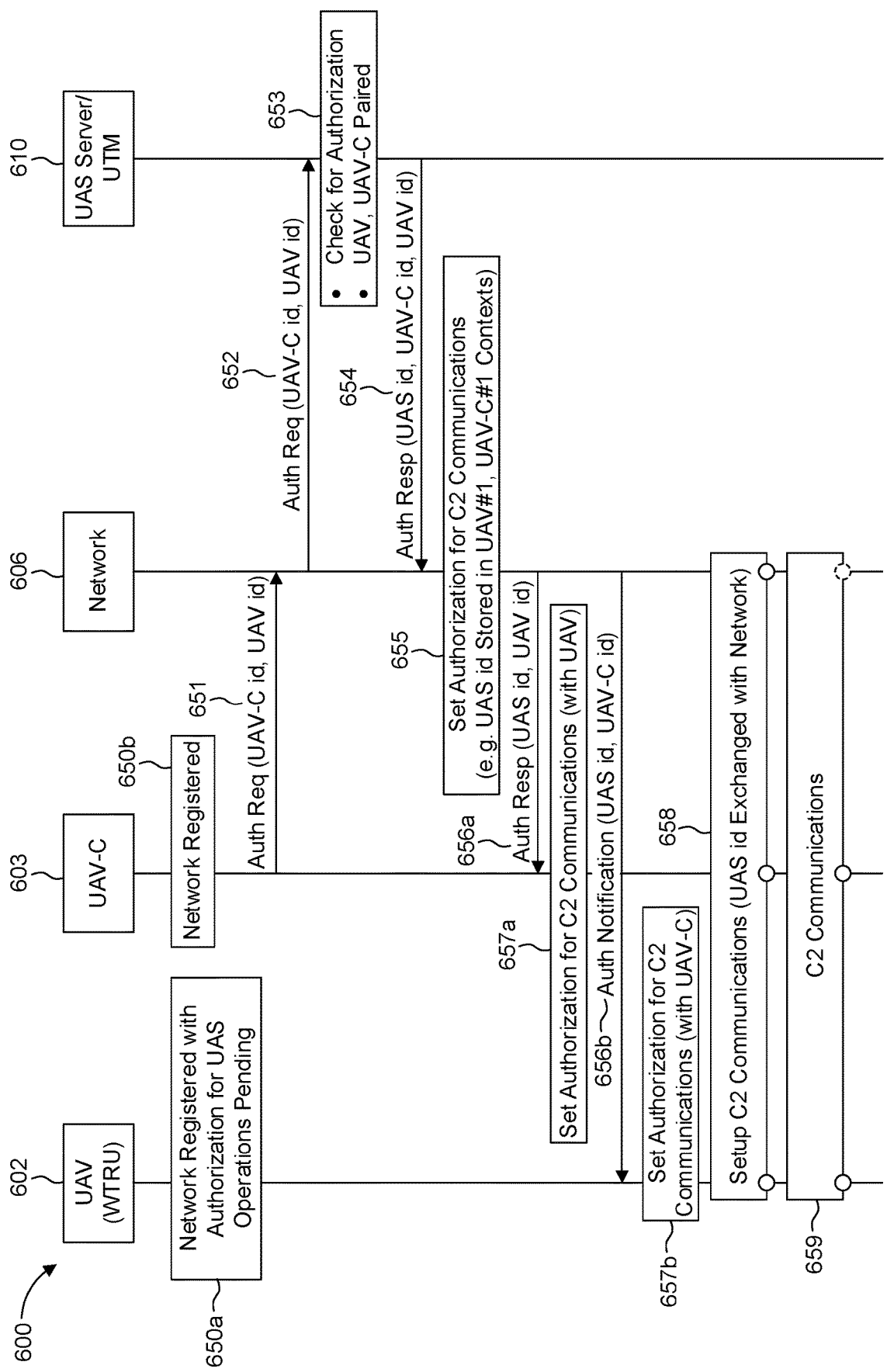
FIG. 6 is a diagram illustrating an example procedure for UAV-controller (UAV-C) assisted UAS paring.

FIG. 6 illustrates an example procedure 600 for UAV-controller (UAV-C) assisted UAS paring, which may be used in combination with any of other embodiments described herein. As illustrated in FIG. 6, UAS (e.g., UAV 602 and UAV-C 603) may be paired during authentication and authorization by USS/UTM 610 with UAV-C assistance. An example of the call flow steps is described herein:

At steps 550a,b, the WTRUs (i.e. UAV WTRU and UAV-C WTRU) may be both network registered. Authorization for flight operation for UAV 602 may be pending the authorization of a UAV-C 603 to fly the UAV 602. The UAV 602 may have performed the initial authentication and authorization steps with the network 606 and UTM 610 as described above.

At steps 651-652, the UAV-C 603 may send an authentication request message to the USS/UTM 610 via the network 606. The message may include its own identity and the identity of the target UAV 602 if available. The message between the UAV-C 603 and the network 606 may be transported over control plane (e.g., NAS signaling such as a registration message, a service request, generic NAS transport messages or a new NAS message) or over user plane. In the case of user plane transport, the UAV-C 603 is assumed to have been authorized to establish a prior data connection (i.e. a PDU session has been established).

At step 653, the USS/UTM 610 may authenticate the UAV-C 603 based on UAS specific credentials (e.g., UAV pilot certificate, owner certificate, or the like) and perform authorization checks based on various UAS parameters such as: submitted flight plan; the provided UAV id that has been authenticated (i.e., authorization to fly pending this UAV-C authorization); and/or a common authenticated binding parameter (e.g., same owner certificate) that were presented by the UAV 602 and UAV-C 603. After a successful authentication and authorization check, the USS/UTM 610 may allocate and store a unique UAS id assigned for the UAV-C 603 and UAV 602 pair.

At step 654, the USS//UTM 610 may send an authentication response message to the UAV-C 603 via the network 606 indicating the outcome of the authorization, the identities of the UAS, UAV 602 and UAV-C 603 that have been authorized to operate. When the authentication and authorization exchange with USS/UTM 610 is done at the application layer (e.g., over user plane, N6), the USS/UTM 610 may also send a separate notification to the network 606 through the appropriate signaling interface (e.g., via NEF).

At step 655, the network 606 may set the authorization information locally (e.g., store in their respective UAV and UAV-C WTRU contexts).

At steps 656a,b, the network 606 may forward the outcome of the UTM authorization to the WTRUs (e.g., UAV-C 603 and UAV 602). For example, at step 656a, the network 606 may send an authorization response message to the UAV-C 603 including the assigned UAS ID and additionally/optionally the associated UAV ID. At step 656b, the network 606 may send an authorization notification message to the UAV 602 including the assigned UAS ID and additionally/optionally the associated UAV-C ID.

At steps 657a,b, the UAV 602 and UAV-C 603 may store the authorization information locally (e.g., in the WTRU Configuration).

At step 658, the UAV 602 and UAV-C 603 may setup connections (e.g., PDU session) for C2 communications. The UAV-C 603 and UAV 602 may provide the UAS ID during the connection setup. The UAS ID provided by the UAV-C 603 may be used by the network 606 to differentiate multiple C2 communications where the UAV-C 603 may be using while controlling multiple UAVs. Similarly, the UAS ID provided by the UAV 602 may help the network 606 differentiate two C2 communications that the UAV 602 may have while the UAV control is transitioned from one UAV-C 603 to another (as described in the change of UAV-C use case below).

At step 659, the UAV 602 and UAV-C 603 may exchange C2 data traffic.

While this call flow steps described in FIG. 6 illustrate the case where the UAV 602 is the first entity requesting authorization for UAS operations, it will be understood that this procedure can be equally applied in the reverse scenario (i.e. by swapping the UAV 602 and UAV-C 603 actors in FIG. 6). Also, message names used in the call flow are examples, other signaling or user planes messages may be used to achieve the intended purpose. It is also noted that the steps described in FIG. 6 are not limited to the sequential order but may be performed or executed in any order different from the steps described above in order to achieve UAV-C/UAV assisted UAS paring.

Embodiments for subscription-based UAS pairing are described herein.

Figure 7:
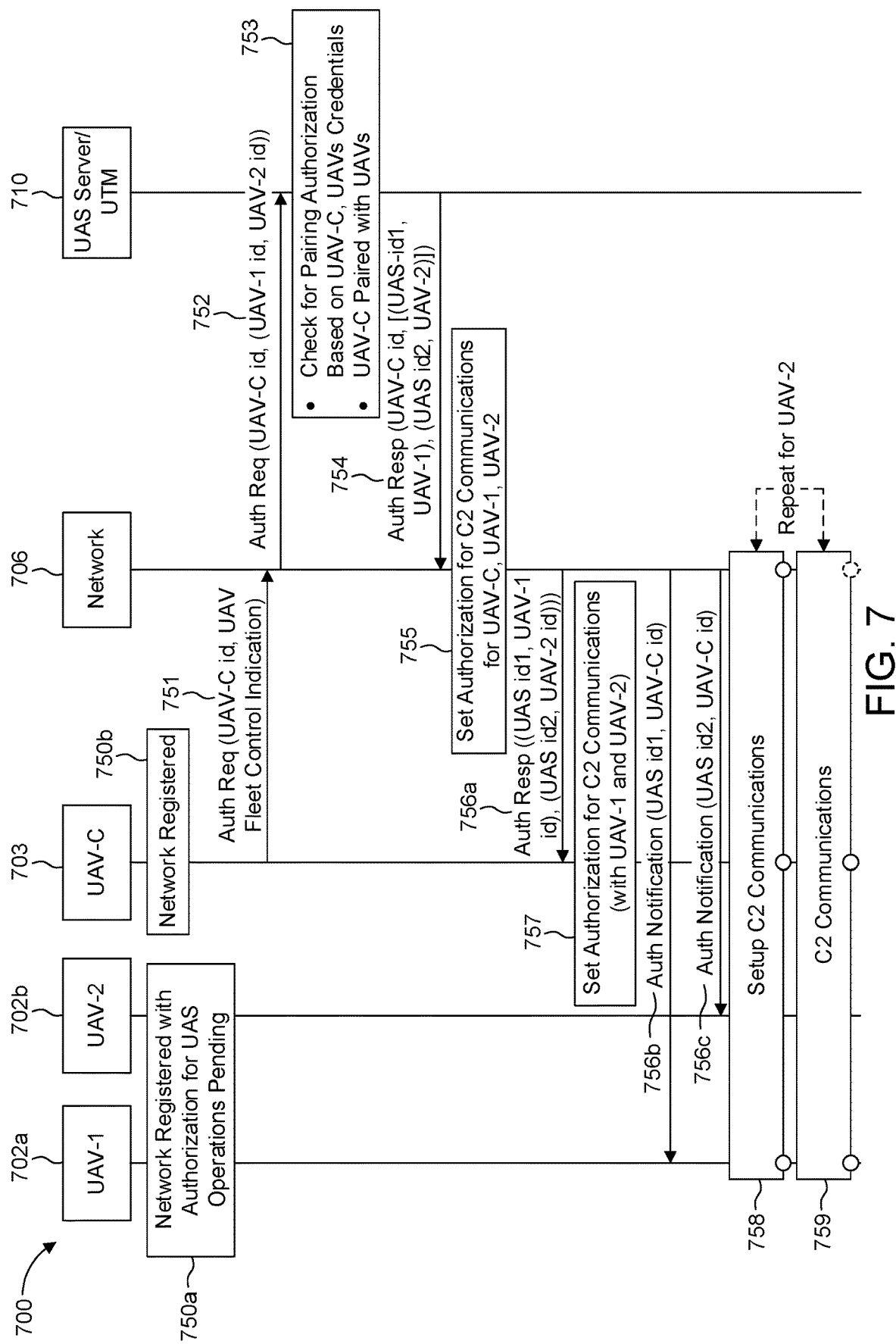
FIG. 7 is a diagram illustrating an example procedure for subscription-based (bulk) paring and authorization.

FIG. 7 illustrates an example procedure 700 for subscription-based (bulk) paring and authorization, which may be used in combination with any of other embodiments described herein. As illustrated in FIG. 7, UAS pairing during authentication and authorization may be performed by a USS/UTM 710 based on subscription information. An example of the call flow steps is described herein:

At step 750a, UAV-1 702a and UAV-2 702b may be registered with authorization for UAS operations pending. At step 750b, the UAV-C 703 may be registered with the network and authorized to operate as a UAV Controller. The UAV-C 703 may wish to pair with multiple UAVs.

At step 751, the UAV-C 703 may transmit a request message to the network 706 to pair with multiple UAVs by including an "UAV fleet control" indication or a similar indication. The network 706 may have a list of UAVs (for example, including UAVs 702a, 702b) associated/stored with the UAV-C subscription.

At step 752, the network 706 may forward the pairing request to the UAS server/UTM 710 including the list of UAVs 702a, 702b to be paired retrieved from the UAV-C subscription information. The network may restrict the list of UAVs 702a, 702b to be paired to those that are currently registered with the network and authorized to operate as UAVs 702a, 702b. For example, the identifiers of UAVs that are offline may be excluded from the pairing request towards the UTM 710. Alternatively or additionally, a list of UAVs associated with the UAV-C may be maintained at the UAS server instead of the 3GPP network. In that case, the network 706 may check from the UAV-C subscription information that the UAV-C 703 is authorized for "bulk pairing" of UAVs 702a, 702b. The network 706 may include a "UAV fleet control" indication instead of a list of UAVs pairing request towards the UTM 710. In yet another embodiment, the network 706 may send one or more individual pairing request for each UAV-C, UAV pair. In that case, the rest of the flow is similar to UAV-C/UAV assisted pairing but repeated as many times as there are UAVs to be paired.

At step 753, the UAS server/UTM 710 may check that UAV-C 703 is authorized for "bulk pairing" with the UAVs 702a, 702b based on the UAV-C and UAV credentials. The UAS server/UTM 710 may pair the UAV-C 703 with each UAV 702a, 702b, assigning a UAS ID for each UAV-C, UAV pair.

At step 754, the UAS server/UTM 710 may send a pairing response to the network 706 providing a list of UAS ID, UAV ID pairs.

At step 755, the network 706 may store the pairing information locally (e.g., store in their respective UAV and UAV-C WTRU contexts).

At steps 756a-c, the network 706 may forward the outcome of the pairing operation to the WTRUs (i.e. UAV-C WTRU and UAV WTRUs). For example, at step 756a, the network 706 may send a pairing response message to the UAV-C 703 including a list of UAS ID, UAV ID pairs. At steps 756b and 756c, the network 706 may send a pairing notification message to each of the UAVs 702a, 702b including the assigned UAS ID and additionally/optionally the associated UAV-C ID.

At step 757, the UAV-C 703 may store the pairing information locally (e.g., in the WTRU configuration or the WTRU context). The UAVs 702a, 702b may also store the pairing information locally (e.g., in the WTRU configuration or the WTRU context).

At steps 758 and 759, C2 communications between the UAV-C 703 and each UAV 702a, 702b may be established.

It is noted that the steps described in FIG. 7 are not limited to the sequential order but may be performed or executed in any order different from the steps described above in order to achieve subscription based UAS paring.

Embodiments for change of UAV-C are described herein.

Figure 8:
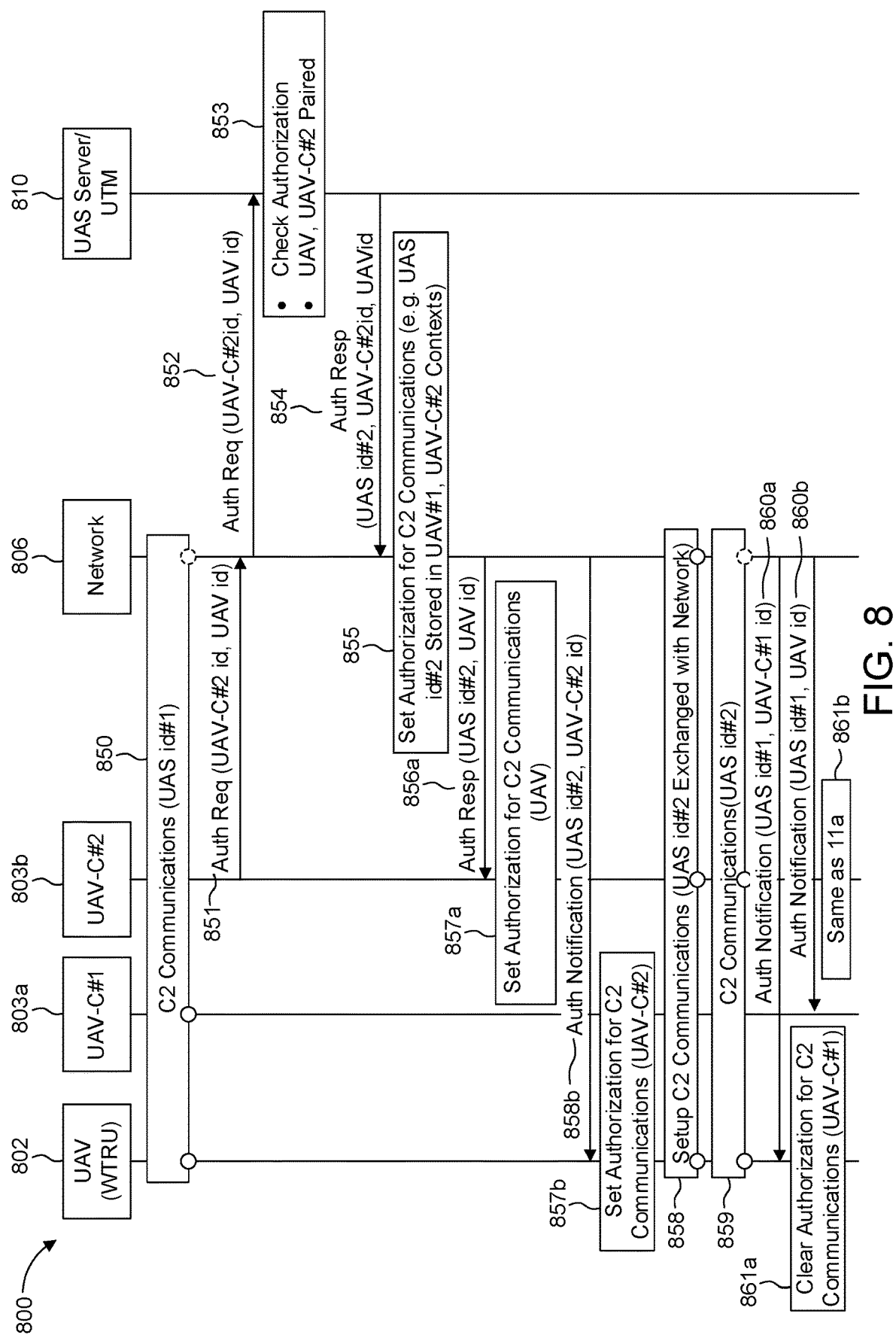
FIG. 8 is a diagram illustrating an example procedure for UAV-C change.

FIG. 8 illustrates an example procedure 800 for UAV-C change, which may be used in combination with any of other embodiments described herein. As illustrated in FIG. 8, UAS pairing update procedure may be performed during a UAV 802 control takeover by a new UAV-C (e.g., UAV-C#2 803b). An example of the call flow steps is described herein:

At step 850, a UAV 802 may be under the control of UAV-C#1 803a. UAV-C#2 803b may wish to take over control of UAV 802 (e.g., due to an emergency event).

Steps 850 to 859 are similar to the UAV-C/UAV assisted UAS pairing procedure described above and are not described herein for brevity. In the case of UAV control take over by the UTM 810, the flow may start with a command from UTM 810 (at step 854). UAV-C#2 803b may start sending C2 commands or receive data from a UAV 802 as soon as the C2 communication path is established. The UAV 802 may execute (transient) C2 commands from UAV-C#1 803a until the C2 communication is established with UAV-C#2 803b and/or until a first C2 command from UAV-C#2 803b is received, to help reduce the control switch over latency to a minimum.

At step 860, the network 806 may send a pairing update notification to UAV 802 and UAV-C#1 803a to remove their respective UAV/UAV-C#1 pairing information.

At step 861, the UAV 802 and UAV-C#1 803a may remove their respective UAV/UAV-C#1 pairing information (e.g., delete from local configuration). The network 806 may optionally or additionally release the PDU sessions used for C2 communications between the UAV 802 and UAV-C#1 803a.

It is noted that the steps described in FIG. 8 are not limited to the sequential order but may be performed or executed in any order different from the steps described above in order to achieve the change of UVA-C.

Embodiments for UAS binding and multi-level authorization are described herein.

The complete authorization procedure may be accomplished in multiple steps, with each step enabling greater functionalities with the final step providing flight authorization. In general, communications-related authorization takes place within the 3GPP system, whereas flight related authorizations are facilitated by the 3GPP system with support of the UTM/USS. In order to enable a flexible system, it is assumed that the WTRU (i.e. UAV WTRU or UAV-C WTRU) and/or the UICC/SIM is independent of the UAV or the UAV-C. Therefore, the WTRU IDs (i.e. UAV WTRU ID or UAV-C WTRU ID) may need to be associated with the respective UAV or UAV-C IDs and the whole system (including the UAV and UAV-C) may be referred as UAS and assigned a UAS ID.

Figure 9:
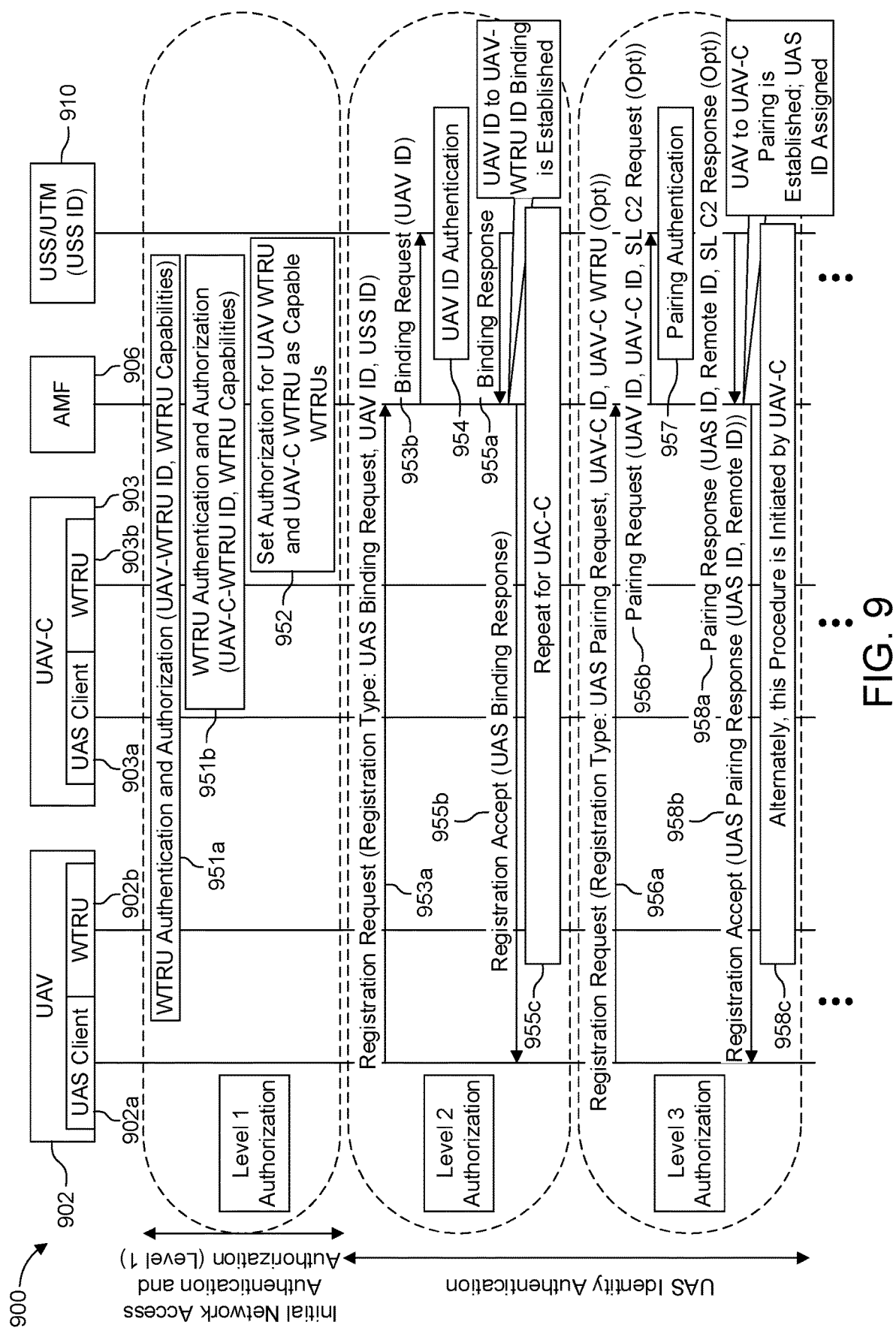
FIG. 9 is a diagram illustrating an example procedure for UAS multi-level authorization facilitated by 3GPP system.
Figure 10:
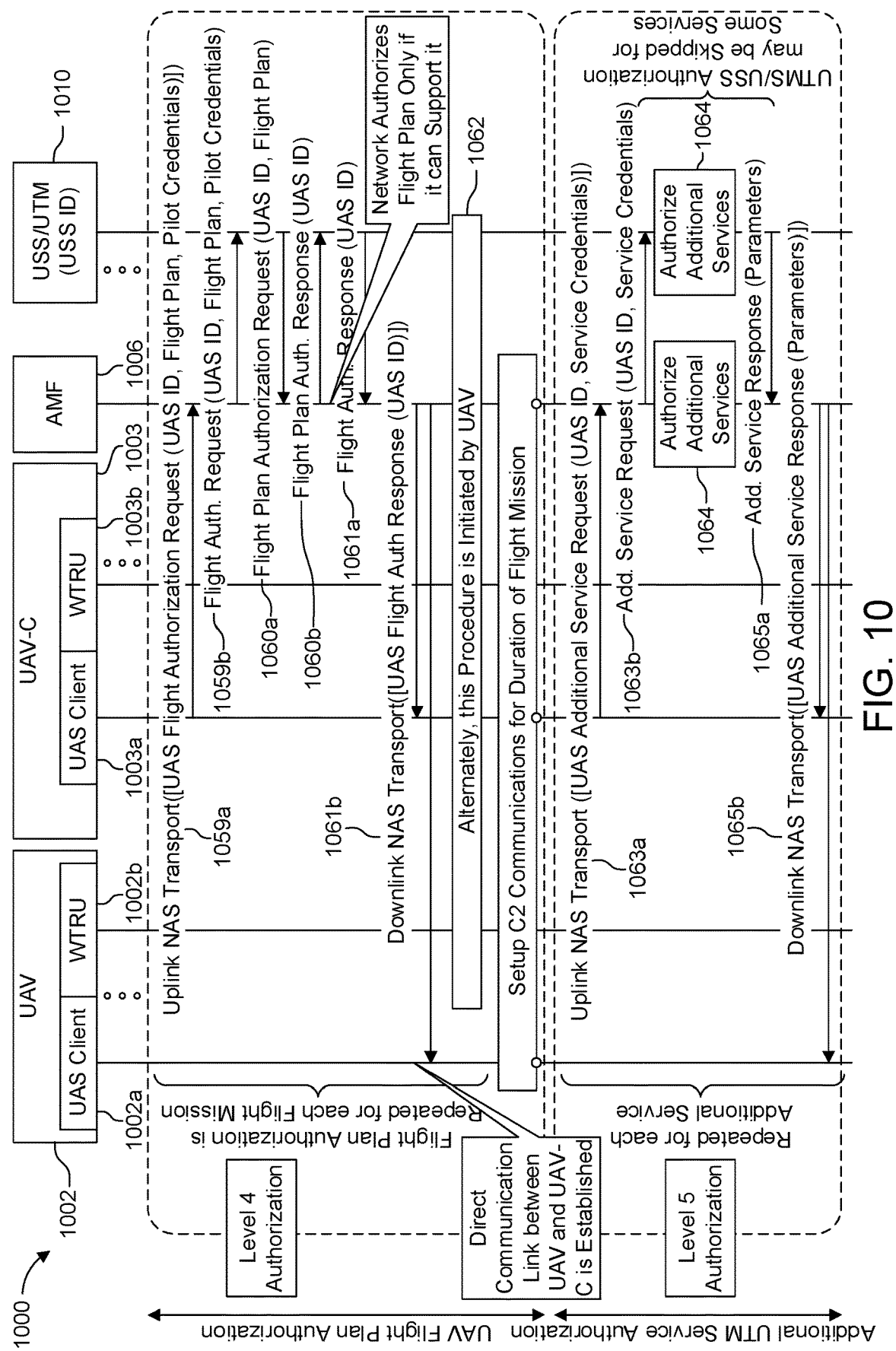
FIG. 10 is a diagram illustrating another example procedure for UAS multi-level authorization facilitated by 3GPP system.

FIGS. 9 and 10 illustrate example procedures 900, 1000 for UAS multi-level authorization facilitated by a 3GPP system, which may be used in combination with any of other embodiments described herein. As illustrated in FIGS. 9 and 10, the procedures 900, 1000 for multi-level identification, binding, pairing and authorization may be facilitated by the UTM/USS 910. The UAV 902 may comprise a UAS client 902a and a UAV WTRU 902b. The UAV-C 903 may comprise a UAS client 903a and a UAV WTRU 903b. The UAS clients 902a, 902b may comprise entities (e.g., protocol stacks or layer) that enable the UAV WTUR 902b and UAV-C WTUR 903b to communicate with the USS/UTM 910. For example, the UAS client 902a may provide an information element (e.g., UAV ID) to the UAV WTRU 902b to transmit to the USS/UTM 910. The UAS client 902a may be a part of UAV WTRU 902b (e.g., UAV WTRU protocol stack or layer) or separate entity. The UAS-C client 903a may be a part of UAV-C WTRU 903b (e.g., UAV-C WTRU protocol stack or layer) or separate entity. Examples of the call flow steps are described herein.

As illustrated in FIG. 9, at step 951a, the UAV WTRU 902b may perform a registration procedure with the network. In addition to the regular parameters, the UAV WTRU 902b may also include WTRU capabilities in the registration request message. This may indicate to the network (e.g., AMF 906) that the UAV WTRU 902b is a UAS-capable WTRU.

At step 951b, the UAV-C WTRU 903b may perform a registration procedure with the network (e.g., AMF 906) in a manner similar to that followed by the UAV WTRU 902b. In addition to the regular parameters, the UAV-C WTRU 903b may also include WTRU capabilities in the registration request message. This may indicate to the network (e.g., AMF 906) that the UAV-C WTRU 903b is a UAS-capable WTRU.

It should be noted that the registration procedures for the UAV WTRU 902b and the UAV-C WTRU 903b may be performed in any order. The UAV WTRU 902b or the UAV-C WTRU 903b may move to the next step in the overall authorization procedure without waiting for the other WTRU (e.g., UAV-C WTRU 903b or UAV WTRU 902b, respectively) to complete its registration request process.

At step 952, at the end of this procedure, the WTRUs (i.e. UAV WTRU 902b, UAV-C WTRU 903b) may achieve level 1 authorization (i.e. initial network access authentication and authorization), which allows them to start communicating with the UTM/USS 910, using NAS messages.

The UAV WTRU 902b that has achieved the level 1 authorization may then perform a binding to associate the UAV WTRU ID with the UAV 902 (i.e. UAV ID) or an airframe ID of the UAV 902. This occurs in two steps. In the first step, the USS/UTM 910 may authenticate the UAV ID. Once the UAV ID is authenticated by the USS/UTM 910, the AMF 906 may bind the UAV ID with the UAV WTRU ID, which is already authenticated in the previous WTRU registration procedures. Therefore, the UAV ID and UAV WTRU ID may be first individually authenticated by the USS/UTM 910 and the AMF 906, respectively, before they are bound together.

At step 953a, the UAV WTRU 902b may first send a registration request (e.g., NAS request message) with the registration type set to binding request, including the UAV ID and the USS ID, if available. Alternately or additionally, the binding request may be transported over other types of NAS messages as well. At this point, the AMF 906 may already know that the UAV WTRU 902b is a legitimate WTRU based on the level 1 authorization above, but may not know that the UAV is a legitimate UAV.

The UAV ID may be a manufacturer assigned serial number or a registration number assigned by a central aviation authority (CAA) or its authorized representative, or another ID that uniquely identifies the UAV airframe.

The USS ID, when included in the registration request message, may indicate to the AMF where to forward the binding request. For example, the USS ID may be a destination address such as an IP address, a domain name, a fully qualified domain name (FQDN), or the like. The USS ID may be preconfigured in the UAV by the USS provider. The USS ID may be replaced by the UAV WTRU 902b with a USS ID List in case the UAV 902 intends to perform flight operations involving multiple USSs/UTMs. In one alternative or additional embodiment, along with the USS ID List, one of the included USS IDs may be identified as the primary USS.

At step 953b, the AMF 906 may forward the binding request to the USS/UTM 910 including the UAV ID. The AMF 906 may also include the UAV WTRU ID, for example, Generic Public Subscription Identifier (GPSI) (e.g., MSIDN or external identifier), International Mobile Equipment Identity (IMEI), Mobile Station International Subscriber Directory Number (MSISDN), International Mobile Subscriber Identity (IMSI), or the like in the binding request. If a UAS service supplier (USS) list is supplied by the UAV 902 without a primary USS being identified, then the AMF 906 may forward the binding request message to each USS included in the USS ID List. If, however, a primary USS ID is also included by the UAV 902 along with the USS ID List, then the AMF 906 may forward the binding request message to the primary USS only. In this example, the primary USS may assume the role of forwarding the binding requests to other USSs. In the USS ID list and collecting the binding response messages, before eventually communicating back to the AMF 906 with the result of the UAV ID authentication procedure.

At step 954, the USS/UTM 910 may authenticate the UAV ID. This may involve additional signaling between the USS/UTM 910 and the UAV 902, which is handled in a similar manner as a regular registration request.

At step 955a, the USS/UTM may 910 send the binding response message to the AMF 906 including the result of the UAV ID authentication procedure at the USS/UTM 910. If a primary USS was identified in the corresponding binding request among a USS ID List, then the binding response from the primary USS to the AMF 906 may contain the collective result of UAV ID authentication procedures at all listed USSs. If, however, the original registration request included a USS ID List without any primary USS ID, then the AMF 906 may need to wait for each of the USS that it sent the binding request to respond with the results of the UAV ID authentication procedure.

The binding response message may include an indication (e.g., code) indicating the status UAV ID authentication procedure. For example, this code or indication may include, but is not limited to, one or more of: ACCEPT, REJECT—USS ID, and the like.

At step 955b, the AMF 906 may forward the binding response within the registration accept message (e.g., NAS response message) to the requesting UAV 902.

At step 955c, the binding procedure may be repeated for the UAV-C 903. Detailed procedures performed at step 955c are similar to the UAV and UAV WTRU binding procedure described above and are not described herein for brevity.

It should be noted that the binding procedure may be performed by the UAV 902 and the UAV-C 903 in any order. At the end of this procedure, the UAV 902 and the UAV-C 903 may achieve level 2 authorization (i.e. binding authorization).

The UAV WTRU 902b that has achieved binding (with UAV 902) or level 2 authorization, may then perform a pairing procedure to pair the UAV 902 with the UAV-C 903. At the end of this procedure, the UAV 902 and the UAV-C 903 may be associated with each other, recognized as a pair, and assigned a UAS ID and/or remote ID.

At step 956a, the UAV 902 may first send a registration request to the AMF 906 with the registration type set to UAS pairing request, including the identity of the UAV-C 903 that it seeks to pair with (i.e. the UAV-C ID). The UAV-C ID may be preconfigured in the UAV 902 or received from the network or the USS/UTM 910. It may also include the UAV-C WTRU ID if available. For UAVs with autonomous flying capabilities (e.g., using UTM navigation), it is contemplated that the provided UAV-C ID may refer to a USS ID/UTM ID if available. Alternatively or additionally, an indication for autonomous flying or the like may be provided. The pairing process in the case of UAVs with autonomous flying capabilities may refer to a UAV-UTM pairing in the embodiments described herein.

At step 956b, the AMF 906 may forward the pairing request to the USS/UTM 910 including the UAV ID, the UAV-C ID, if provided by the UAV. Alternatively, or additionally, the paring request may include a sidelink command and control request (SL C2 Request) for direct communication between the UAV 902 and the UAV-C 903. Examples of the direct communication may include, but are not limited to, proximity service (Pro Se), WiFi Direct®, and D2D using licensed band or ISM.

At step 957, upon receiving the pairing request, the USS/UTM 910 may fetch the stored profiles for the supplied UAV ID and UAV-C ID. Based on the UAV 902 and UAV-C 903 capabilities, allowed pairing lists provided, for example, by the operator, etc., the USS/UTM 910 may determine the outcome of the pairing procedure and/or assign a UAS ID to the UAV 902 and UAV-C 903 pair.

At step 958a, the USS/UTM 910 may send the pairing response message to the AMF 906 including the result of the pairing authorization procedure.

The pairing response message may include a code or indication indicating the status of UAS pairing procedure. This may include, but is not limited to, one or more of: ACCEPT, REJECT—UAV-C capabilities, REJECT—allowed pairing list, and REJECT—counterpart binding not complete. The paring response message may also include a UAS ID implicitly indicating that the UAV 902 is paired with the UAV-C 903, a Remote ID, and/or SL C2 Response.

At step 958b, the AMF 906 may forward the pairing response within the registration accept message (e.g., NAS response message) to both the requesting UAV 902 and also the requested UAV-C 903. The registration accept message (or NAS response message) may include the assigned UAS ID and/or the Remote ID. In one embodiment the paring request and response messages may be exchanged with USS/UTM via an SMF using respectively PDU Session establishment request and PDU Session establishment accept messages.

At step 958c, the binding procedure is alternatively or additionally initiated by the UAV-C. It should be noted that the paring procedure may be performed by the UAV 902 and the UAV-C 903 in any order. Details of the paring procedures initiated by the UAV-C 903 are similar to those initiated by the UAV 902 and are not described herein for brevity.

At the end of this procedure, the UAV 902 and the UAV-C 903 may be paired together and, as a pair, they may achieve level 3 authorization (i.e. paring authorization).

Although it is not illustrated in FIG. 9, the level 2 authorization (i.e. binding authorization) and the level 3 authorization (i.e. paring authorization) may be combined and performed as one biding and paring authorization from the UAV 902 and/or the UAV-C 903. For example, in case of UAV 902 initiated binding and paring procedures, the UAV 902 may transmit a NAS request message that includes one or more information elements needed for the biding and paring authorization. For example, the UAV 902 may transmit the NAS request message may include at least one of a binding request indication, UAV ID, USS ID, UAS paring request indication, UAV-C ID, or UAV-C WTRU ID. In case of UAV-C 903 initiated binding and paring procedures, the UAV-C 903 may transmit a similar NAS request message for the binding and paring authorization.

The next step, flight authorization or level 4 authorization may allow setup of direct communication between the UAV 1002 and the UAV-C 1003, enabling the UAV 1002 to take flight.

As illustrated in FIG. 10, at step 1059a, to initiate the flight authorization procedure, the UAV-C 1003 may send the uplink NAS transport message including the NAS message container to the AMF 1006. The NAS message container may include one or more fields including UAS ID, flight plan, intended mission and pilot credentials.

At step 1059b, the AMF 1006 may forward the flight authorization request message to the USS/UTM 1010 including the same elements as received from the UAV-C 1003 in the uplink NAS message.

At step 1060a, the USS/UTM 1010 may send a flight plan authorization request to the AMF 1006, including the UAS ID and the requested flight plan. The flight plan may include the waypoints from the take-off point to the landing point or a series of regularly spaced coordinates that the UAV 1002 intends to fly through along the path from the take-off point to the landing point, along with the corresponding time instants.

The AMF 1006 may check the requested flight plan against a series of network related parameters, such as available network coverage along the flight path, network loading at the corresponding cells along the flight plan.

At step 1060b, the AMF 1006 may respond to the USS/UTM 1010 with the flight plan authorization response that includes the result of flight plan authorization. Some of the possible result codes included in the message may include, but are not limited to, ACCEPT, REJECT—network not available (flight plan segment), REJECT—network congestion. The flight plan authorization response may also include suggested alternatives in case of result code=REJECT, including alternate routes to achieve network coverage for the entire flight plan or alternate times to avoid network congestion.

At step 1061a, the USS/UTM 1010 may send a flight authorization response to the UAV-C WTRU 1003b including the result code.

At step 1061b, the AMF 1006 may send the flight authorization response back to the requesting UAV-C 1003 using the downlink NAS transport that includes a NAS message container. The flight authorization response may also be repeated to the UAV 1002. This message may include a reason code for a reject response. Successful completion of this procedure may result in the establishment of C2 communications between the UAV 1002 and the UAV-C 1003.

At step 1062, in another option (e.g., UAV 1002 using UTM navigation), the flight authorization procedure may be initiated by the UAV 1002 as well. Details of the steps are similar to those imitated by the UAV-C 1003 and are not described herein for brevity.

At the end of this step, the level 4 authorization (i.e. flight authorization) may be granted to the UAS 1002, enabling setting up of direct C2 communications between the UAV 1002 and the UAV-C 1003, thereby facilitating the UAV flight.

It is noted that the flight authorization or level 4 authorization is valid for the requested flight mission. At the end of the authorized flight mission, the AMF 1006 may terminate the authorization (e.g., either locally or via explicit signaling between the WTRUs (e.g., UAV WTRU 1002b and UAV-C WTRU 1003b)) and the UAV 1002 and UAV-C 1003 may be required to initiate the flight authorization process for a different flight mission.

At steps 1063a,b, 1064, and 1065a,b, after successfully gaining flight authorization or level 4 authorization, the UAV-C 1003 (or UAV 1002) may initiate a request message to request further service authorization such as network positioning service, weather information, etc. These additional services may be authorized by the AMF 1006, in some cases with assistance of the UAS service supplier (USS)/UTM 1010. The result code for this authorization is conveyed to the WTRU (e.g., UAV WTRU 1002b or UAV-C WTRU 1003b) via a downlink NAS transport message, including a NAS message container.

Upon successful completion of this procedure, the UAS may gain level 5 authorization (i.e. additional service authorization) to enable special network services in support of flight operations.

It is noted that the steps described in FIGS. 9 and 10 are not limited to the sequential order but may be performed or executed in any order different from the steps described above in order to achieve the multiple level authorization described above.

In some embodiments, a WTRU (e.g., UAV WTRU or UAV-C WTRU) may be configured to transmit varying levels of UAS data based on different levels of authorization. For example, the WTRU may transmit a UAS binding request including at least UAV-C ID and USS ID on the condition that it has received successful response for WTRU authentication and authorization. The WTRU may transmit a UAS pairing request including at least UAV ID (and optionally or additionally UAV WTRU ID) on the condition that it has received successful UAS binding response. The WTRU may transmit a UAS flight authorization request via UL NAS transport including at least UAS ID or Remote ID, flight plan, mission profile and pilot credentials on the condition that it has received successful UAS pairing response including UAS ID and/or remote ID. The WTRU may receive configuration for C2 (and optionally payload) communications on the condition that the flight plan is successfully authorized.

In additional embodiments, USS ID of UAS binding request may include a list of USS IDs (example scenario of flight plan comprising more than one USS) or alternatively primary USS ID and a list of secondary USS. UAS ID may be a subset or part of remote ID such as from a certain most significant bit (MSB) to least significant bit (LSB). The UAV-C ID may include the USS ID as part of a decorated name (e.g., UAV C id @USS id). Additional service may be authorized from/by USS/UTM before or after flight authorization. UAS entities (either UAV or UAV-C) may be able to discover available counterpart entities (e.g., UAV-C or UAV) upon successful authentication and binding, but prior to pairing.

Embodiments for identification, binding and authorization with multiple UTMs/USSs are described herein.

Figure 11A:
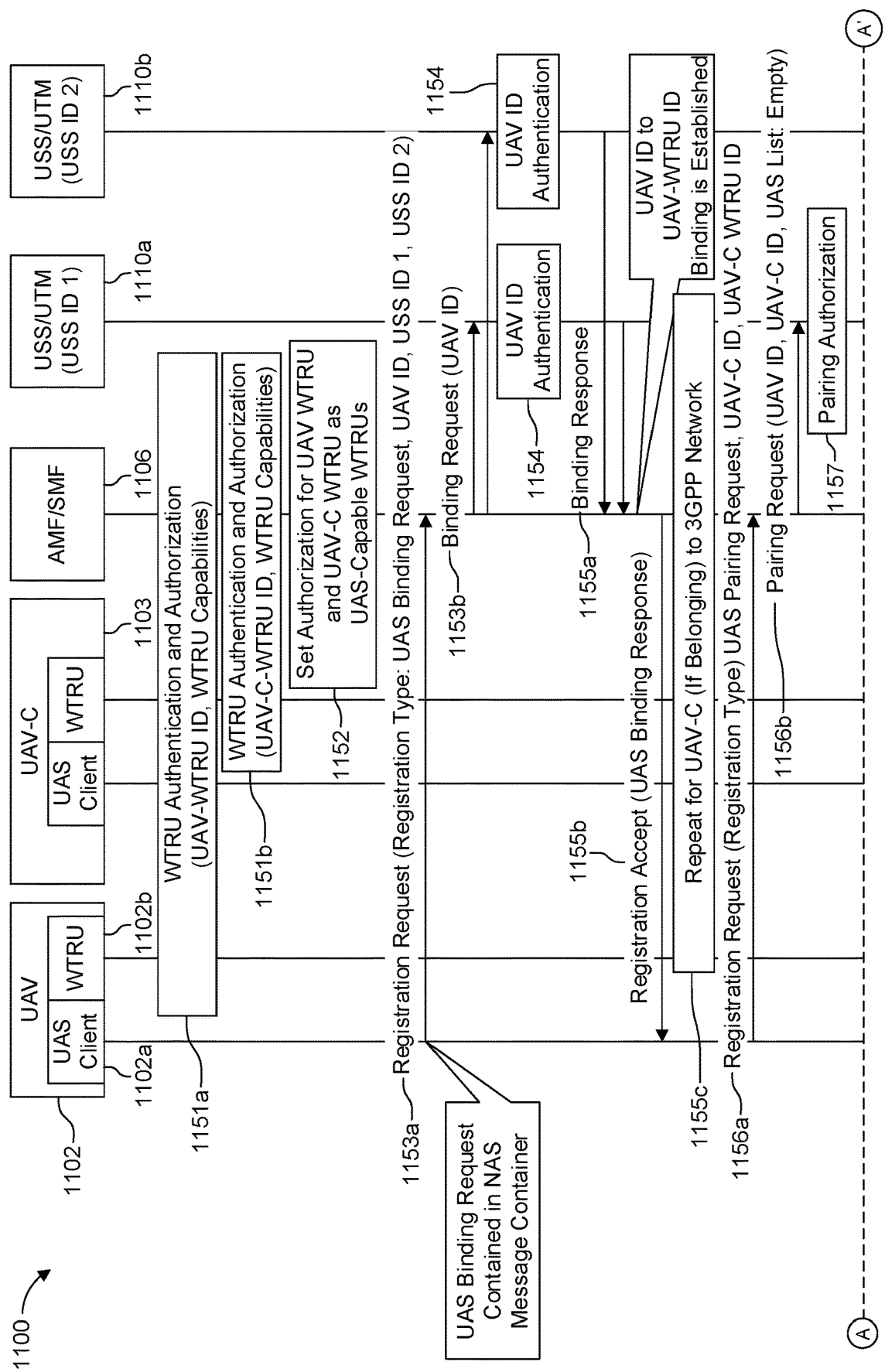
FIG. 11A is a diagram illustrating an example procedure for multi-level authorization across multiple UTMs and/or UAS service supplier (USS)
Figure 11B:
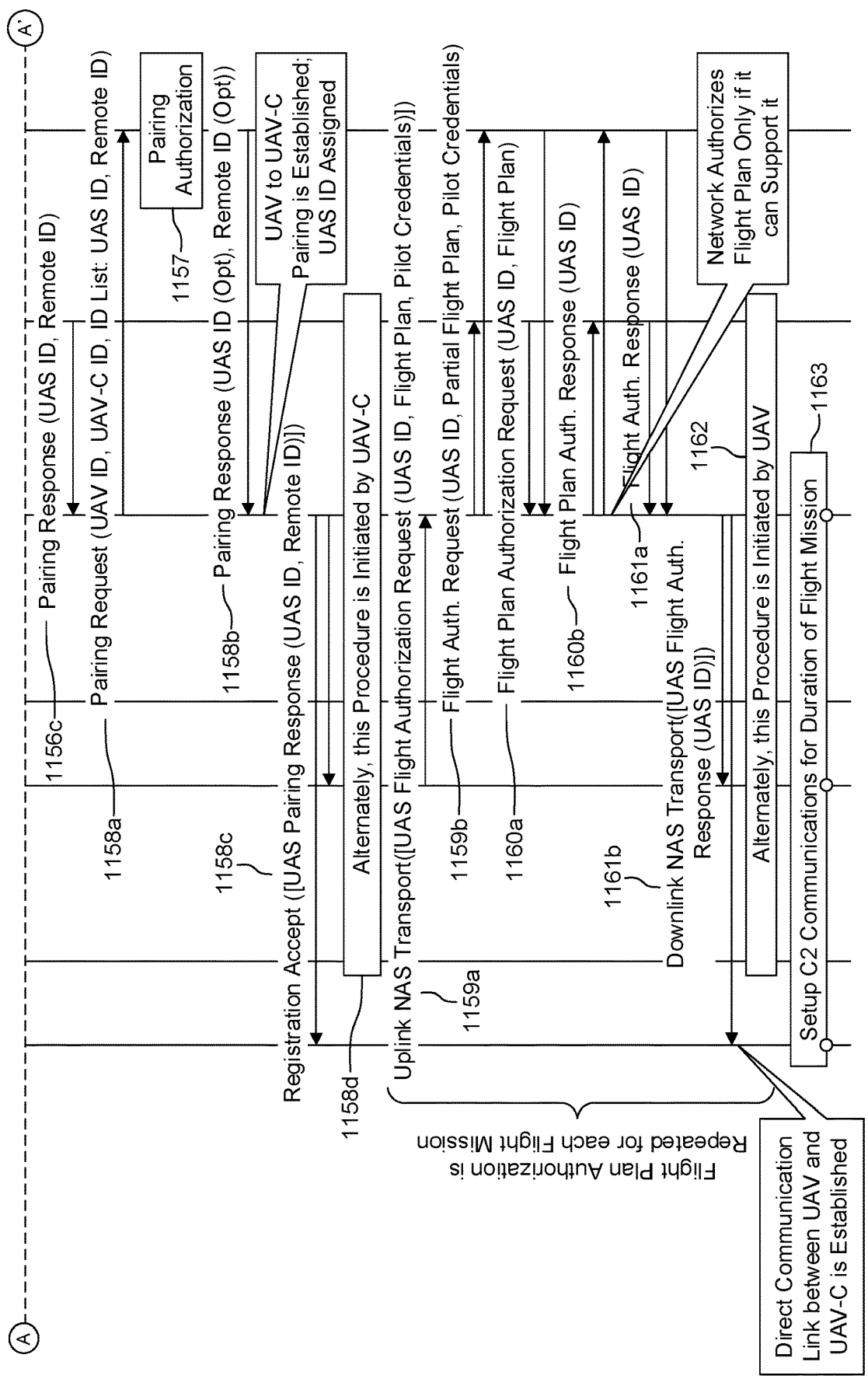
FIG. 11B is a continuation of FIG. 11A.

FIGS. 11A, B illustrate an example procedure 1100 for multi-level authorization across multiple UTMs and/or UAS service supplier (USS), which may be used in combination with any of other embodiments described herein. As illustrated in FIGS. 11A, B, multi-level UAS authorization across multiple USSs/UTMs may be performed with two USSs/UTMs 1110a, 1110b identified by USS ID 1 and USS ID 2. An example of the call flow steps is described herein.

Steps 1151a,b and 1152 may be the same or similar to those steps described in FIG. 9 and are not described herein for brevity.

At steps 1153a,b, 1154, and 1155a,b, the AMF 1106 may send the binding request message to both USSs/UTMSs 1110a, 1110b (i.e. USS ID 1 and USS 2). Only when the AMF 1106 receives binding responses from both USSs/UTMs 1110a, 1110b does it forward the complete decision along with any applicable decision codes to the UAV 1102. The UAV 1102 can proceed to the next step (i.e. pairing), for example, when it receives the pairing response message with a result code=SUCCESS from each of the requested USSs/UTMs 1110a, 1110b.

At steps 1156a,b, 1157 and 1158a-d, the pairing authorization procedure may require individual authorizations from each USS/UTM 1110a, 1110b listed in the UAV request. In this case, the AMF 1106 may send the pairing request message to one of the USSs/UTMs 1110a, 1110b, and if successful, a pairing response message with result code=SUCCESS is returned along with the USS/UTM-assigned UAS ID and/or remote ID. When sending subsequent pairing request messages to other requested USSs/UTMs 1110a, 1110b, the UAS ID, and/or the remote ID may be included by the AMF 1106 in the pairing request message.

At steps 1159a,b, 1160a, b, and 1161a,b, flight authorization procedure when multiple USSs/UTMs 1110a, 1110b are present may require the AMF 1106 to send the flight plan request message to each of the USS/UTM 1110a, 1110b individually and then collect the responses from them collectively.

At step 1162, alternatively, this procedure may be initiated by the UAV 1102 as well. Details of the steps initiated by the UAV 1102 are similar to those imitated by the UAV-C 1103 and are not described herein for brevity.

At step 1163, when the UAV 1102 and UAV-C 1103 receive the flight authorization response message with the reason code set to SUCCESS, direct link for C2 communications (e.g., a PDU session) between the UAV 1102 and UAV-C 1103 may be established via SMF 1 1106a and level 4 authorization may be established.

It is noted that the steps described in FIGS. 11A, B are not limited to the sequential order but may be performed or executed in any order different from the steps described above in order to achieve the multiple level authorization across multiple UTMs/USSs 1110a, 1110b described above.

In some embodiments, a WTRU (e.g., UAV-C WTRU) may be configured to perform multi-level authorization when the UAV belongs to a different PLMN. For example, the WTRU may transmit a UAS binding request including at least UAV-C ID and an USS ID on the condition that it has received successful response for WTRU authentication and authorization. The WTRU may transmit a UAS pairing request including at least UAV ID (and optionally UAV WTRU ID) and PLMN ID of network servicing the UAV on the condition that it has received successful UAS binding response. The WTRU may transmit a UAS flight authorization request via UL NAS transport including at least UAS ID or remote ID, flight plan, mission profile and pilot credentials on the condition that it has received successful UAS pairing response containing UAS ID and/or remote ID. The WTRU may receive configuration for C2 (and optionally payload) communications on the condition that the flight plan is successfully authorized.

In additional embodiments, the PLMN ID of the network that services the counterpart entity (e.g., UAV-C or UAV) may not be supplied by the UAV or UAV-C, in which case the USS/UTM may provide the PLMN ID to the requesting 3GPP network.

Embodiments for identification, binding, pairing and authorization across PLMNs are described herein.

Figure 12A:
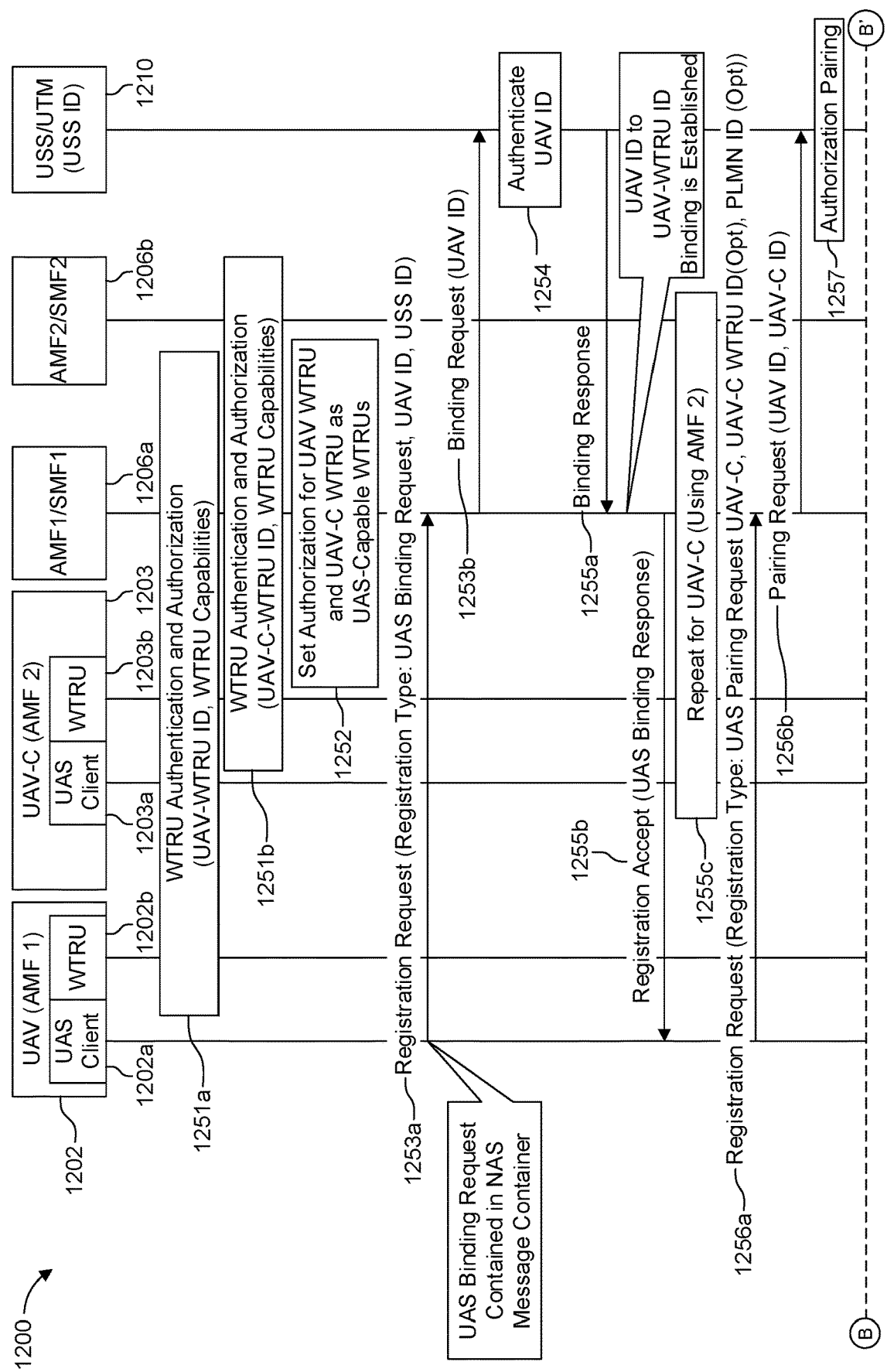
FIG. 12A is a diagram illustrating an example procedure for identification, binding, paring, and authorization across public land mobile networks (PLMNs)
Figure 12B:
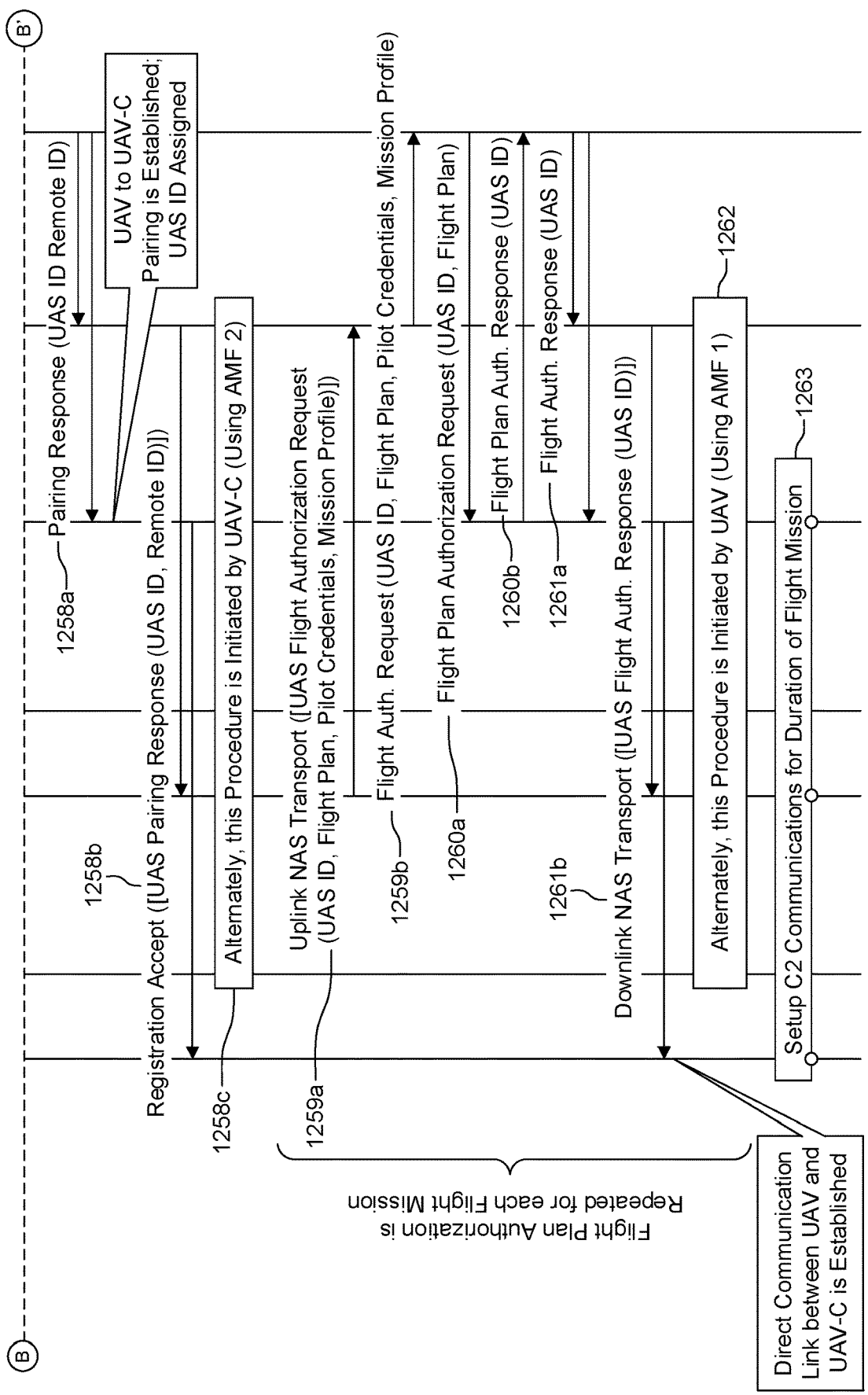
FIG. 12B is a continuation of FIG. 12A.

FIGS. 12A, B illustrates an example procedure 1200 for identification, binding, paring, and authorization across public land mobile networks (PLMNs), which may be used in combination with any of other embodiments described herein. Identification, binding, pairing and multi-level authorization across multiple PLMNs may need to be supported, for example, when UAV 1202 and UAV-C 1203 belong to different PLMNs. The example shown in FIGS. 12A, B refers to the two AMFs 1206a, 1206b belonging to the different PLMNs where the UAV 1202 and the UAV-C 1203 are connected as AMF 1/SMF 1 1206a and AMF 2/SMF 2 1206b, respectively. An example of the call flow steps is described herein.

Steps 1251a,b and 1252 may be the same or similar to those steps described in FIG. 9 and are not described herein for brevity.

At steps 1253a,b, 1254, and 1255a-c, the binding procedure where the UAV ID is bound to the UAV WTRU ID, and also the UAV-C ID is bound to the UAV-C WTRU ID occurs with the respective AMF (i.e. AMF 1 1206a or AMF 2 1206b) of the PLMN to which the UAV WTRU 1202b or the UAV-C 1203 is connected to. The UAV ID or the UAV-C ID, as the case may be, may be authenticated by the USS/UTM 1210 and then concerned AMF (i.e. AMF 1 1206a or AMF 2 1206b) may bind either the UAV ID to the UAV WTRU ID or the UAV-C ID to the UAV-C WTRU ID.

At steps 1256a,b, 1257, 1258a-c, after the binding procedure is completed (i.e. level 2 authorization achieved), either the UAV 1202 or the UAV-C 1203 can initiate the pairing procedure to pair the two entities and be identified as a UAS. In the example shown in FIGS. 12A, B, the UAV initiates the pairing procedure by sending a registration request (e.g., NAS request message) with registration type set to UAS pairing request and with the requested UAV-C ID included. Alternatively or additionally, the UAV 1202 may also include the UAV-C WTRU ID, if it is available. The pairing request may be forwarded by the AMF 1 1206a to the USS/UTM 1210 to authorize the pairing of the two entities.

Once the USS/UTM 1210 authorizes the pairing of the UAV 1202 and UAV-C 1203, the pairing response message (e.g., NAS response message) may be sent to the requesting AMF (i.e. AMF 1 1206a, responsible for UAV 1202 in this example) and also to the AMF responsible for the counterpart entity within the UAS (i.e. AMF 2 1206b, responsible for UAV-C 1203 in this example). Each of the AMFs (i.e. AMF 1 1206a and AMF 2 1206b in this example) may then forward the pairing responses to the UAV 1202 and UAV-C 1203, respectively, within the registration accept message.

At steps 1259a,b, 1260a,b, 1261a,b and 1262, a flight authorization request may be initiated by either the UAV 1202 or UAV-C 1203. In the example shown in FIGS. 12A, B, the UAV-C 1203 initiates this process by sending a uplink NAS transport message containing the UAS flight authorization to AMF 2 1206b. This may include the proposed flight plan, pilot credentials and the mission profile. The flight authorization request may be forwarded by AMF 2 1206b to the USS/UTM 1210. The USS/UTM 1210 may send the flight plan as part of the flight plan authorization request message to the AMF of the PLMN responsible for the UAV (i.e. AMF 1 1206a in this example), and in return receives flight plan authorization response.

The USS/UTM 1210 may then send the flight authorization response to the two AMFs 1206a, 1206b, which then forward them to the UAV 1202 and UAV-C 1203, respectively in the NAS downlink transport message. This may include a reason code such as ACCEPT, REJECT—cause, etc.

When the UAV 1202 and UAV-C 1203 receive the flight authorization response message with the reason code set to SUCCESS, direct link for C2 communications (e.g., a PDU session) between the UAV 1202 and UAV-C 1203 may be established via SMF 1 1206a and level 4 authorization may be established.

It is noted that the steps described in FIGS. 12A, B are not limited to the sequential order but may be performed or executed in any order different from the steps described above in order to achieve the identification, binding, paring, and authorization across PLMNs described above.

In some embodiments, a WTRU (e.g., UAV-C WTRU) configured to perform multi-level authorization when the UAV belongs to a different PLMN. The WTRU may transmit a UAS binding request including at least UAV-C ID and an USS ID on the condition that it has received a successful response for WTRU authentication and authorization. The WTRU may transmit a UAS pairing request including at least UAV ID (and optionally UAV WTRU ID) and PLMN ID of network servicing the UAV on the condition that it has received a successful UAS binding response. The WTRU may transmit a UAS flight authorization request via UL NAS transport including at least UAS ID or Remote ID, flight plan, mission profile and pilot credentials on the condition that it has received successful UAS pairing response including UAS ID and/or Remote ID. The WTRU may receive a configuration for C2 (and optionally payload) communications on the condition that the flight plan is successfully authorized.

In additional embodiments, the PLMN ID of the network that services the counterpart entity (UAV-C or UAV) may not be supplied by the UAV or UAV-C, in which case the USS/UTM may provide the PLMN ID to the requesting 3GPP network.

Figure 13:
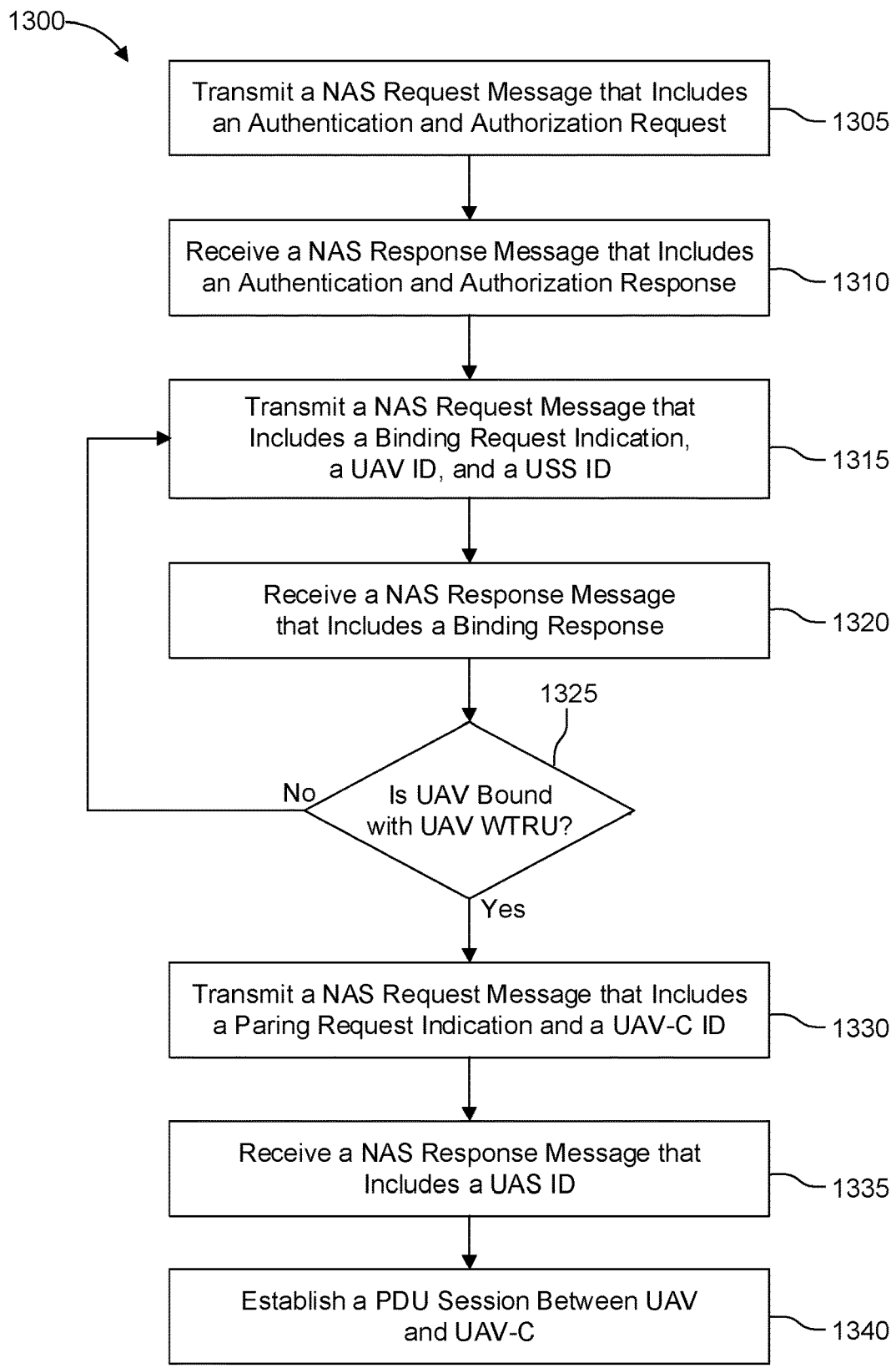
FIG. 13 is a diagram illustrating an example procedure for binding and paring between UAV and UAV-C.

FIG. 13 illustrates an example procedure 1300 for binding and paring between UAV and UAV-C, which may be used in combination with any of other embodiments described herein. The UAV may comprise a UAV WTRU for cellular communication. The UAV-C may include a UAV-C WTRU for cellular communication. At step 1305, a UAV may transmit, to an AMF, a (first) NAS request message that includes an authentication and authorization request comprising a UAV WTRU identification (UAV WTRU ID) and one or more UAV WTRU capabilities for cellular communications. This NAS request message may be transmitted via the UAV WTRU to the AMF. The one or more UAV WTRU capabilities may include one or more indicators indicating that the UAV WTUR is a UAS-capable WTRU. At step 1310, the UAV may receive, from the AMF, a (first) NAS response message that includes an authentication and authorization response indicating whether the UAV WTRU is authenticated and authorized for network access. The UAV may receive the NAS response message via the UAV WTRU from the AMF.

At step 1315, the UAV may transmit, to the AMF, a (second) NAS request message that includes a binding request indication, a UAV identification (UAV ID), and a USS identification (USS ID). Based on the USS ID, the UAV ID may be carried by the AMF in a binding request message to the USS/UTM for binding authorization of the UAV WTRU with the UAV associated with the UAV ID. The USS ID may be a destination address of the NAS request message (i.e. address for USS/UTM) such as an IP address, a domain name, a fully qualified domain name (FQDN), or the like. The USS ID may be preconfigured in the UAV by the USS provider or received from the network. The (second) NAS request message may be transmitted via the UAV WTRU to the AMF. At step 1320, the UAV may receive, from the AMF, a (second) NAS response message that includes a binding response indication indicating whether the UAV is bound with the UAV WTRU. The binding response indication may be determined by the USS/UTM and informed to the AMF by the USS/UTM. The (second) NAS response message may be received via the UAV WTRU from the AMF.

At step 1325, if the binding response indication indicates that the UAV is successfully bound with the UAV WTUR, at step 1330, the UAV may transmit, to the AMF, a (third) NAS request message that includes a paring request indication and a UAV-C ID. The UAV-C ID may be carried in a paring request message by the AMF to the USS/UTM for paring authorization of the UAV with a UAV-C associated with the UAV-C ID. The (third) NAS request message may be a PDU session request and transmitted by the UAV WTRU to the SMF via the AMF. At step 1335, the UAV may receive, from the AMF, a (third) NAS response message that includes a UAS ID indicating that the UAV is paired with the UAV-C. The NAS response message may additionally include a Remote ID. The UAS ID may be assigned by the USS/UTM upon authorization of the UAV and UAV-C pair and forwarded to the AMF from the USS/UTM. The (third) NAS response message may be a PDU session response and received by the UAV WTRU from the SMF via AMF.

At step 1340, upon receiving the UAS ID, the UAV may establish, via a session management function (SMF), a PDU session with the UAV-C for command and control (C2) communication. The UAV ID may be a manufacturer assigned serial number (or airframe ID) and the UAV WTRU ID is GPSI, MSIDN, IMEI, MSISDN, IMSI, or the like. The UAV-C ID may be a manufacturer assigned serial number.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in an unmanned aerial vehicle (UAV) having a UAV wireless transmit/receive unit (WTRU) for cellular communication, the method comprising:
transmitting, to a network node, a first non-access stratum (NAS) request message that includes a registration request indication, a UAV identification (UAV ID), and a USS identification (USS ID);
receiving, from the network node, a first NAS response message that indicates that registration was accepted;
transmitting, to the network node, a second NAS request message comprising pairing information for the UAV and a UAV-controller (UAV-C) to be paired with the UAV, wherein transmitting the second NAS request message is performed after receipt of the first NAS response message;
receiving, from the network node, a second NAS response message that indicates that pairing was accepted;
transmitting, to the network node, after receipt of the indication that pairing was accepted, a request for command and control (C2) communication authorization between the UAV and the UAV-C; and
receiving, from the network node, based on the request for C2 authorization, a third NAS response message indicating rejection of authorization for C2 communication.

2. The method of claim 1, wherein the second NAS request message is a protocol data unit (PDU) session request message and the second NAS response message is a PDU session response message.

3. The method of claim 1, further comprising:
upon receiving the second NAS response message, establishing, via a network node performing a session management function (SMF), a PDU session with the UAV-C for the C2 communication.

4. The method of claim 1, wherein the second NAS response message includes a remote identification (Remote ID).

5. The method of claim 1, wherein the second NAS request message includes a UAV-controller (UAV-C) identification (UAV-C ID) and the UAV-C ID is a manufacturer assigned serial number.

6. The method of claim 1,
wherein, based on the USS ID, the UAV ID is carried in a binding request to an unmanned aerial system (UAS) service supplier (USS)/UAS traffic management (UTM) for binding authorization of the UAV WTRU with the UAV associated with the UAV ID;
wherein the binding response indication is determined by the USS/UTM; and
wherein transmitting the second NAS request message is performed responsive to receipt of the binding response indication.

7. The method of claim 6,
wherein the second NAS request message is transmitted on a condition that the UAV is bound with the UAV WTRU, wherein the second NAS request message includes the UAV-C ID.

8. The method of claim 6, further comprising:
transmitting, to the network node, another NAS request message that includes an authentication and authorization request that includes a UAV WTRU identification (UAV WTRU ID) and one or more UAV WTRU capabilities for the cellular communication; and
receiving, from the network node, another NAS response message that includes an authentication and authorization response indicating whether the UAV WTRU is authenticated and authorized for access to the cellular network.

9. The method of claim 8, wherein the UAV ID is a manufacturer assigned serial number and the UAV WTRU ID is an international mobile equipment identity (IMEI).

10. The method of claim 1, wherein the second NAS request message includes a UAV ID associated with the UAV and a UAV-C ID associated with the UAV-C, and wherein an UAS comprises the UAV and the UAV-C.

11. An unmanned aerial vehicle (UAV) comprising:
a UAV wireless transmit/receive unit (WTRU) for cellular communication; and
a processor,
the UAV WTRU and the processor configured to:
transmit, to a network node, a first non-access stratum (NAS) request message that includes a registration request indication, a UAV identification (UAV ID), and a USS identification (USS ID);
receive, from the network node, a first NAS response message that indicates that registration was accepted;
transmit, to the network node, a second NAS request message comprising pairing information for the UAV and a UAV-controller (UAV-C) to be paired with the UAV, wherein transmitting the second NAS request message is performed after receipt of the first NAS response message;
receive, from the network node, a second NAS response message that indicates that pairing was accepted;
transmit, to the network node, after receipt of the indication that pairing was accepted, a request for command and control (C2) communication authorization between the UAV and the UAV-C; and
receive, from the network node, a third NAS response message indicating rejection of authorization for C2 communication.

12. The UAV of claim 11, wherein the second NAS request message is a protocol data unit (PDU) session request message and the second NAS response message is a PDU session response message.

13. The UAV of claim 11, wherein the UAV WTRU and the processor are further configured to, upon receiving the second NAS response message, establish, via a network node performing a session management function (SMF), a PDU session with the UAV-C for the C2 communication.

14. The UAV of claim 11, wherein the second NAS response message includes a remote identification (Remote ID).

15. The UAV of claim 11, wherein the second NAS request message includes a UAV-controller (UAV-C) identification (UAV-C ID) and the UAV-C ID is a manufacturer assigned serial number.

16. The UAV of claim 11,
wherein, based on the USS ID, the UAV ID is carried in a binding request to an unmanned aerial system (UAS) service supplier (USS)/UAS traffic management (UTM) for binding authorization of the UAV WTRU with the UAV associated with the UAV ID;
wherein the binding response indication is determined by the USS/UTM; and
wherein transmitting the second NAS request message is performed responsive to receipt of the binding response indication.

17. The UAV of claim 16, wherein the second NAS request message is transmitted on a condition that the UAV is bound with the UAV WTRU, wherein the second NAS request message includes the UAV-C ID.

18. The UAV of claim 16, wherein the UAV WTRU and the processor are further configured to:
transmit, to the network node, another NAS request message that includes an authentication and authorization request that includes a UAV WTRU identification (UAV WTRU ID) and one or more UAV WTRU capabilities for the cellular communication; and
receive, from the network node, another NAS response message that includes an authentication and authorization response indicating whether the UAV WTRU is authenticated and authorized for access to the cellular network.

19. The UAV of claim 18, wherein the UAV ID is a manufacturer assigned serial number and the UAV WTRU ID is an international mobile equipment identity (IMEI).

20. The UAV of claim 11, wherein the second NAS request message includes a UAV ID associated with the UAV and a UAV-C ID associated with the UAV-C, and wherein an UAS comprises the UAV and the UAV-C.

* * * * *